United States Patent
Switkes et al.

(10) Patent No.: US 11,614,752 B2
(45) Date of Patent: Mar. 28, 2023

(54) VEHICLE PLATOONING SYSTEMS AND METHODS

(71) Applicant: Peloton Technology, Inc., Mountain View, CA (US)

(72) Inventors: Joshua P. Switkes, Mountain View, CA (US); Joseph Christian Gerdes, Los Altos, CA (US); Eugene Berdichevsky, Oakland, CA (US)

(73) Assignee: PELOTON TECHNOLOGY, INC., Pacific Grove, CA (US)

(*) Notice: Subject to any disclaimer, the term of this patent is extended or adjusted under 35 U.S.C. 154(b) by 381 days.

(21) Appl. No.: 16/427,846

(22) Filed: May 31, 2019

(65) Prior Publication Data
US 2019/0346862 A1 Nov. 14, 2019

Related U.S. Application Data

(60) Continuation of application No. 15/589,124, filed on May 8, 2017, now Pat. No. 10,481,614, which is a
(Continued)

(51) Int. Cl.
*G05D 1/02* (2020.01)
*G08G 1/00* (2006.01)
(Continued)

(52) U.S. Cl.
CPC ........... *G05D 1/0293* (2013.01); *B60W 10/04* (2013.01); *B60W 10/20* (2013.01);
(Continued)

(58) Field of Classification Search
None
See application file for complete search history.

(56) References Cited

U.S. PATENT DOCUMENTS

| | | | |
|---|---|---|---|
| 7,554,435 B2* | 6/2009 | Tengler | B60Q 1/44 340/425.5 |
| 7,593,811 B2* | 9/2009 | Schmidt | G05D 1/0278 701/300 |

(Continued)

OTHER PUBLICATIONS

Tsao et al., "An Automated Highway System Dedicated to Inter-City Trucking: Design Options, Operating Concepts, and Deployment", ITS Journal 7: 169-196, 2002 (Year: 2002).*
(Continued)

*Primary Examiner* — Tamara L Weber
(74) *Attorney, Agent, or Firm* — Redbrick IP, P.C.

(57) ABSTRACT

Systems and methods for coordinating and controlling vehicles, for example heavy trucks, to follow closely behind each other, or linking, in a convenient, safe manner and thus to save significant amounts of fuel while increasing safety. In an embodiment, on-board controllers in each vehicle interact with vehicular sensors to monitor and control, for example, relative distance, relative acceleration/deceleration, and speed. Additional safety features in at least some embodiments include providing each driver with one or more visual displays of forward and rearward looking cameras. Long-range communications are provided for coordinating vehicles for linking, and for communicating analytics to fleet managers or others.

20 Claims, 19 Drawing Sheets

Related U.S. Application Data continuation of application No. 14/855,044, filed on Sep. 15, 2015, now Pat. No. 9,645,579, which is a continuation-in-part of application No. 14/292,583, filed as application No. PCT/US2014/030770 on Mar. 17, 2014, now Pat. No. 9,665,102, which is a division of application No. 13/542,622, filed on Jul. 5, 2012, now Pat. No. 8,744,666, and a division of application No. 13/542,627, filed on Jul. 5, 2012, now Pat. No. 9,582,006.

(60) Provisional application No. 61/792,304, filed on Mar. 15, 2013, provisional application No. 61/505,076, filed on Jul. 6, 2011.

(51) Int. Cl.

| | | |
|---|---|---|
| *B60W 10/04* | (2006.01) | |
| *B60W 10/20* | (2006.01) | |
| *B60W 30/165* | (2020.01) | |
| *G05D 1/00* | (2006.01) | |
| *H04L 67/12* | (2022.01) | |
| *H04W 84/00* | (2009.01) | |

(52) U.S. Cl.
CPC ......... *B60W 30/165* (2013.01); *G05D 1/0088* (2013.01); *G05D 1/0217* (2013.01); *G05D 1/0295* (2013.01); *G08G 1/22* (2013.01); *H04L 67/12* (2013.01); *B60W 2554/801* (2020.02); *B60W 2710/18* (2013.01); *B60W 2710/20* (2013.01); *B60W 2720/10* (2013.01); *G05D 2201/0213* (2013.01); *H04W 84/005* (2013.01)

(56) References Cited

U.S. PATENT DOCUMENTS

| | | | |
|---|---|---|---|
| 2004/0036601 A1* | 2/2004 | Obradovich | B60W 30/18145 340/540 |
| 2006/0089771 A1* | 4/2006 | Messih | B60R 21/0132 701/45 |
| 2006/0095195 A1* | 5/2006 | Nishimura | B60W 30/025 701/96 |
| 2007/0244641 A1* | 10/2007 | Altan | B60W 50/16 701/300 |
| 2009/0259354 A1* | 10/2009 | Krupadanam | B60W 10/06 701/22 |
| 2010/0188203 A1* | 7/2010 | Wallace | B60W 10/184 340/454 |
| 2010/0250088 A1* | 9/2010 | Grolle | B60W 10/184 701/96 |
| 2010/0256852 A1* | 10/2010 | Mudalige | G08G 1/22 701/24 |

OTHER PUBLICATIONS

Mak et al., "Multichannel Medium Access Control for Dedicated Short-Range Communications", IEEE Transactions on Vehicular Technology, vol. 58, No. 1, Jan. 2009 (Year: 2009).*

* cited by examiner

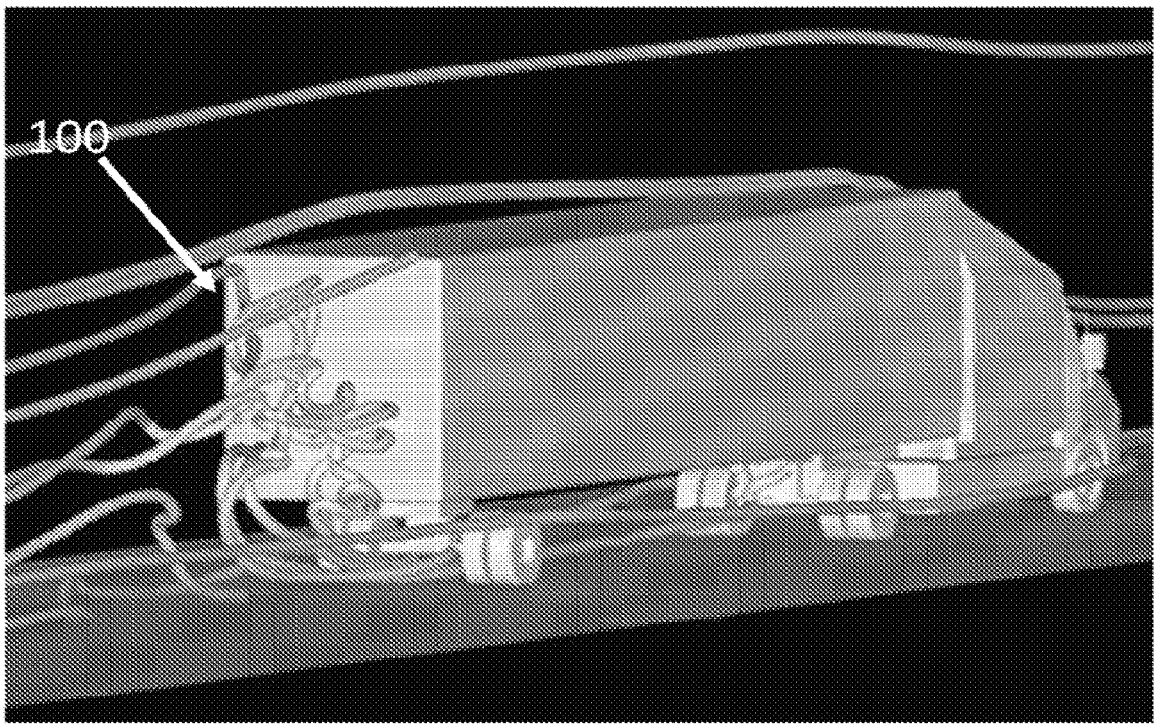
Figure 1: Airflow Around a Heavy Truck.
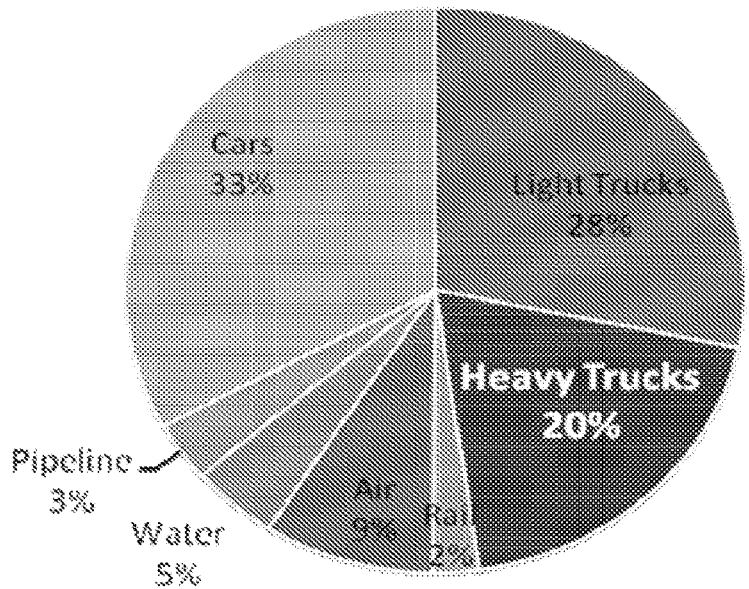
Figure 2: US Transportation Fuel Use

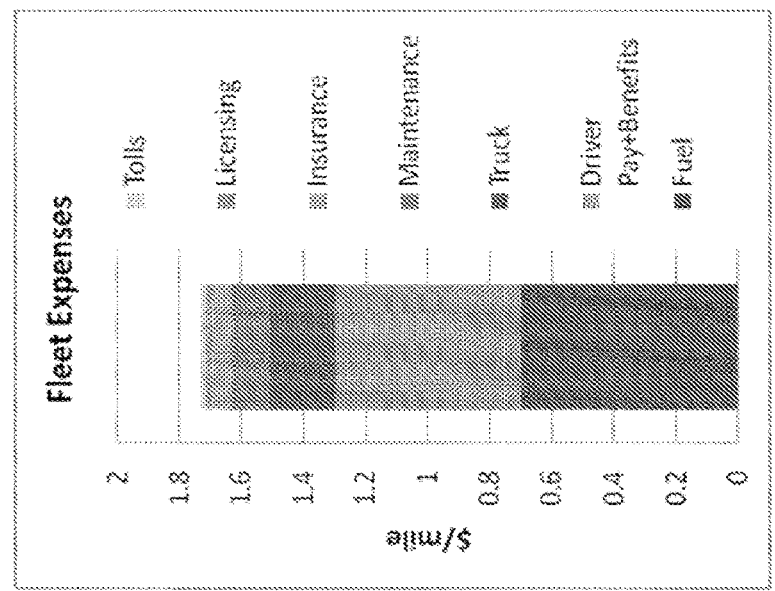
Figure 3A: Heavy Truck Fleet Expenses
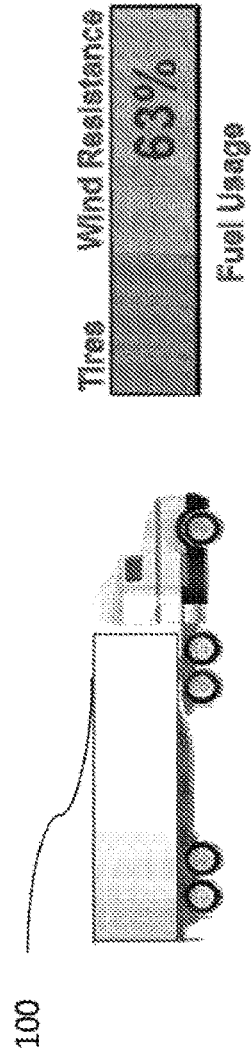
Figure 3B: Heavy Truck Wind Resistance Contribution to Fuel Use Fuel Savings Versus Vehicle Gap (Heavy Trucks)

Long Range Coordination Functionality

Short Range Linking Functionality

Long Range Coordination System

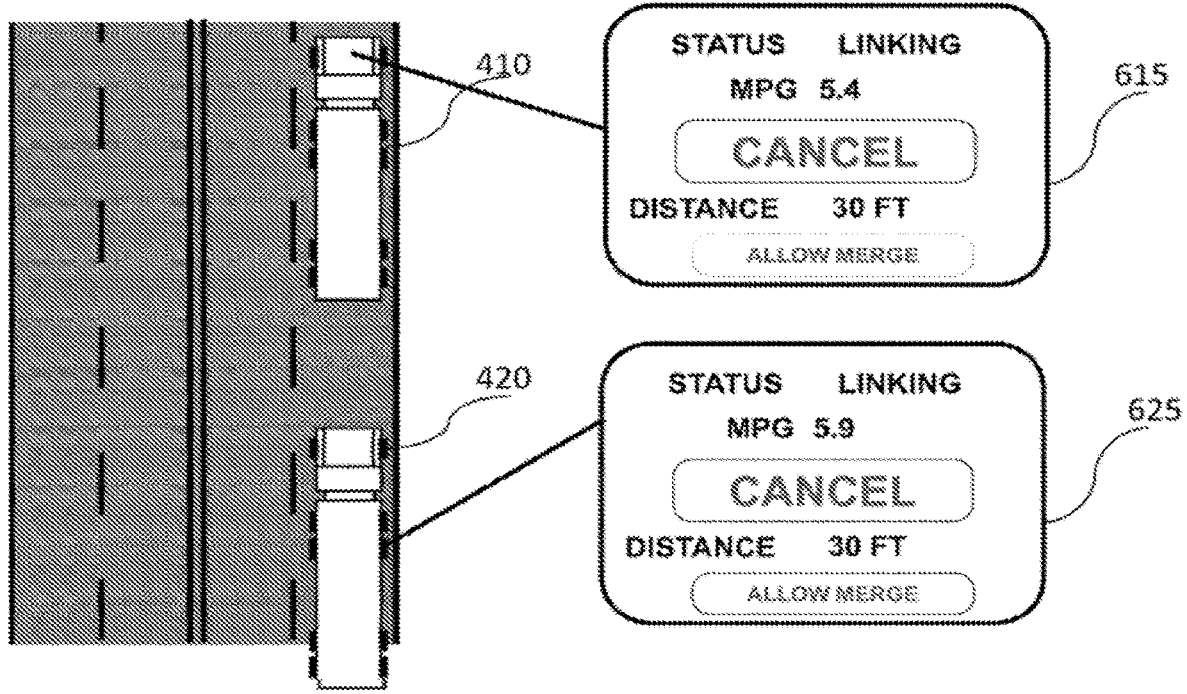
Figure 7B: Short range linking functionality
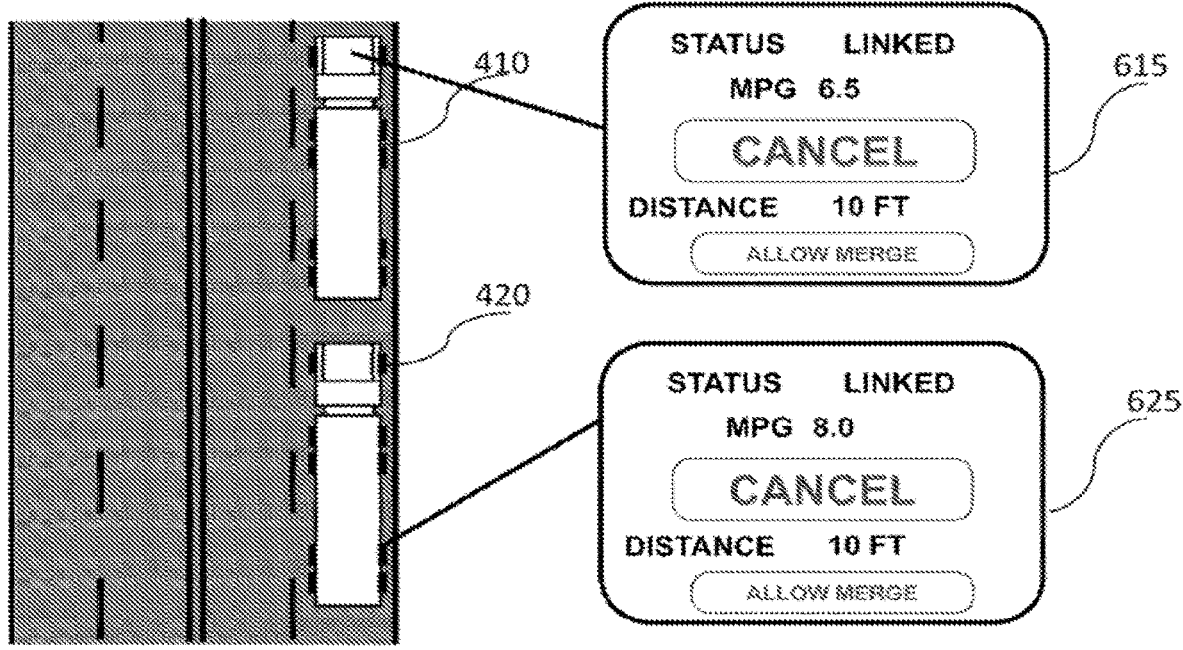
Figure 7C: Short range linking functionality

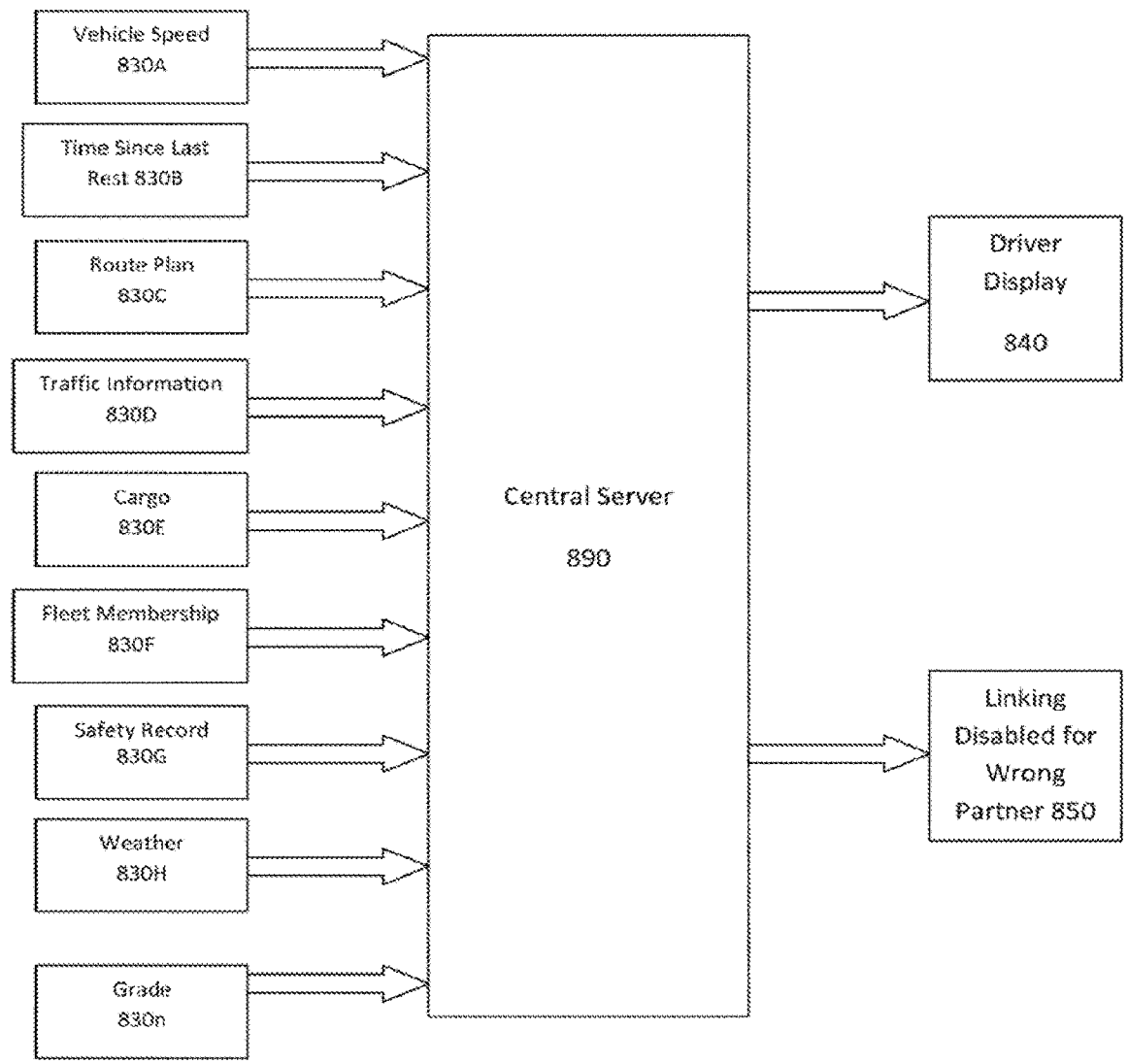
Figure 8B
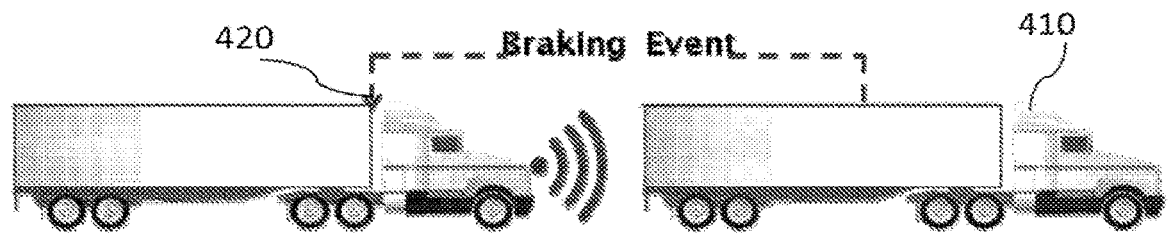
Figure 9A: Short range communication

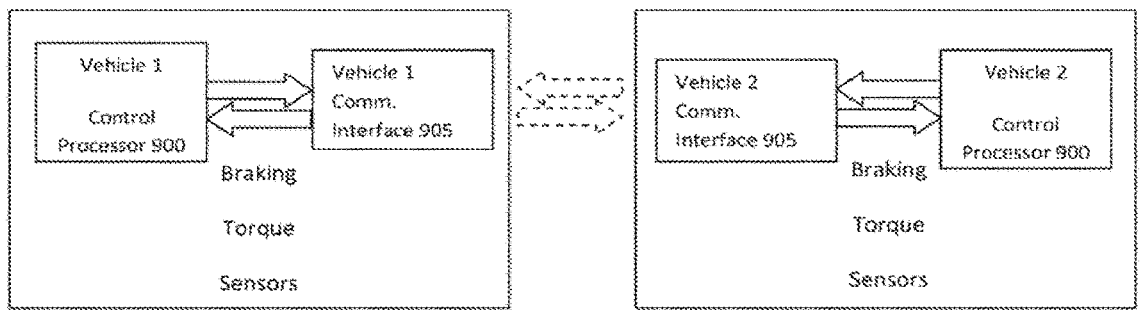
Figure 9B
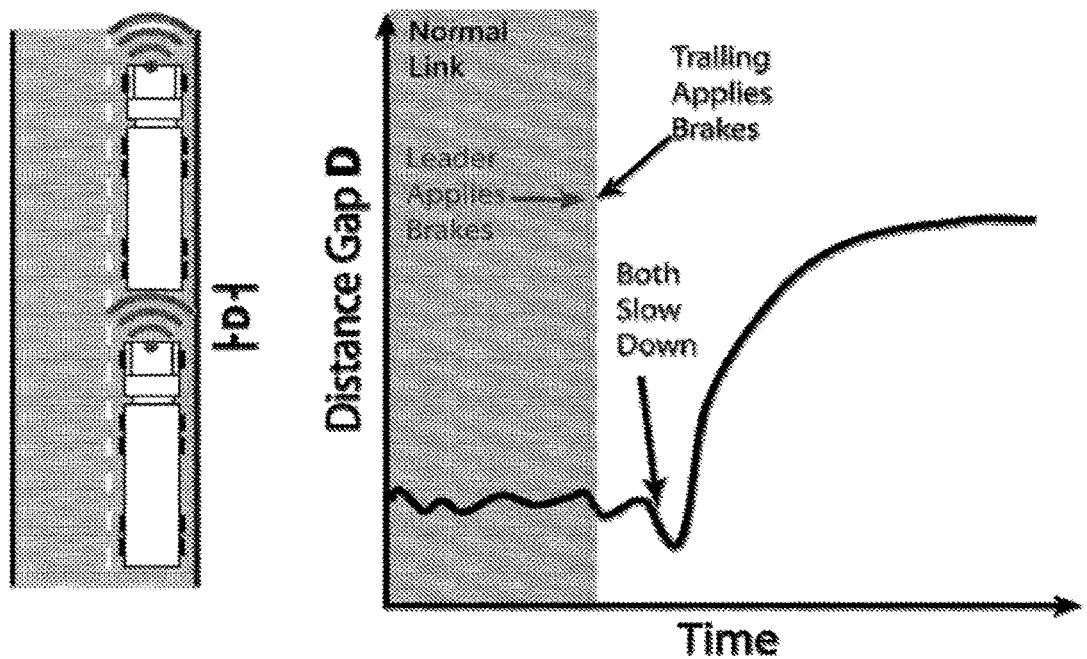
Figure 10: Example of short range communication utility Simplified System Block Diagram

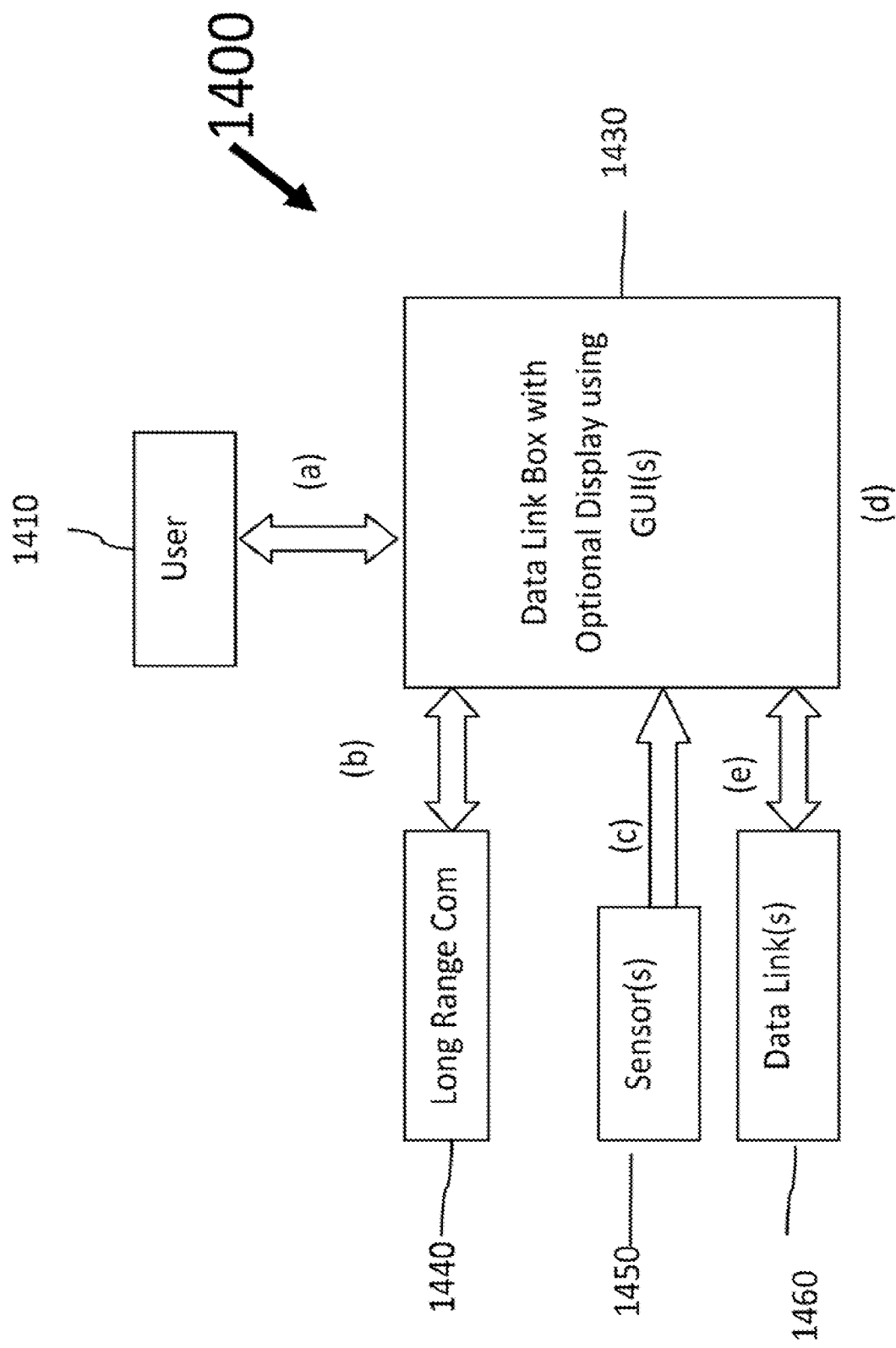
Figure 14: Simplified System for Lead Vehicle

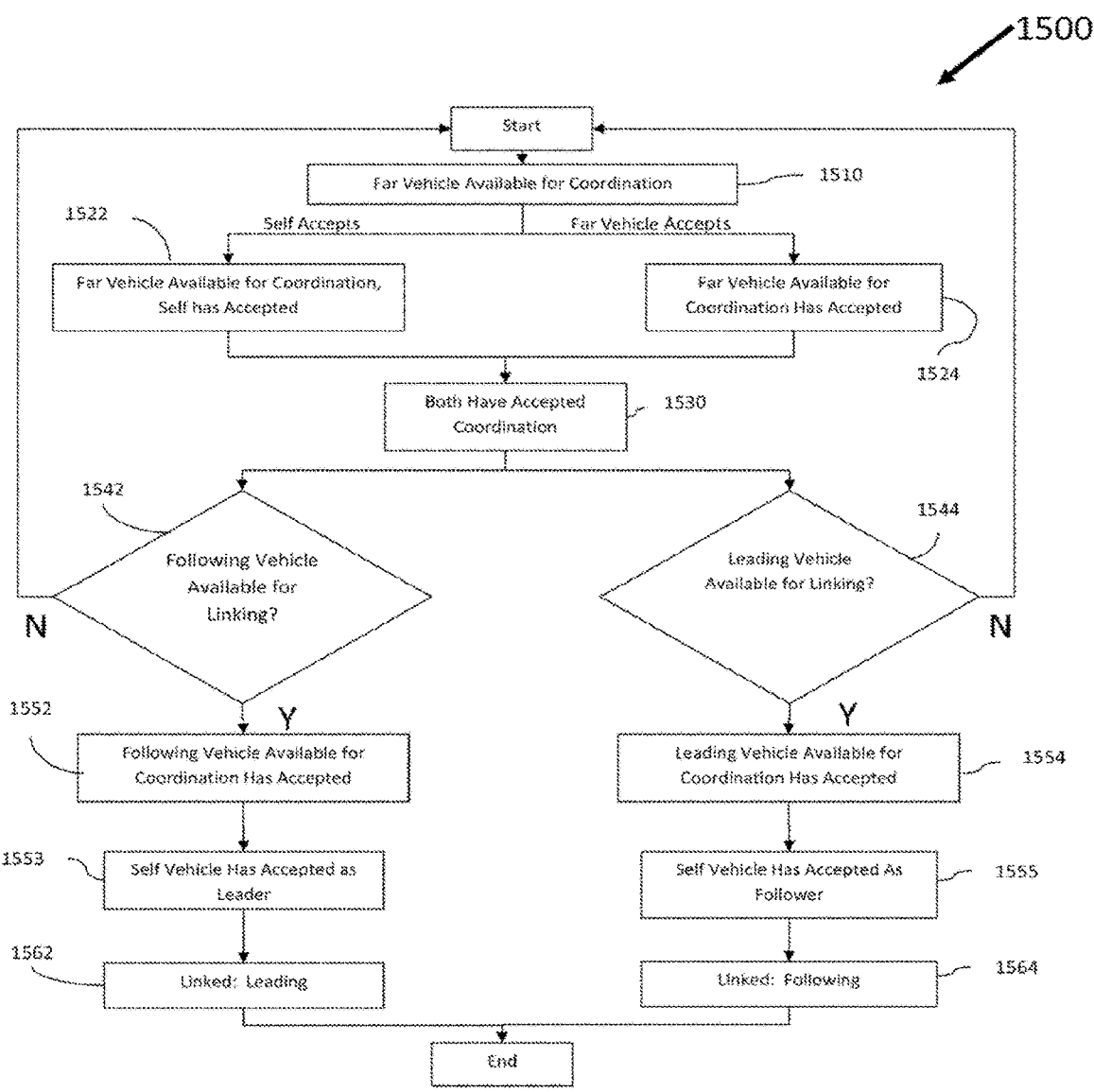
Figure 15A: Coordination and Linking Flowchart

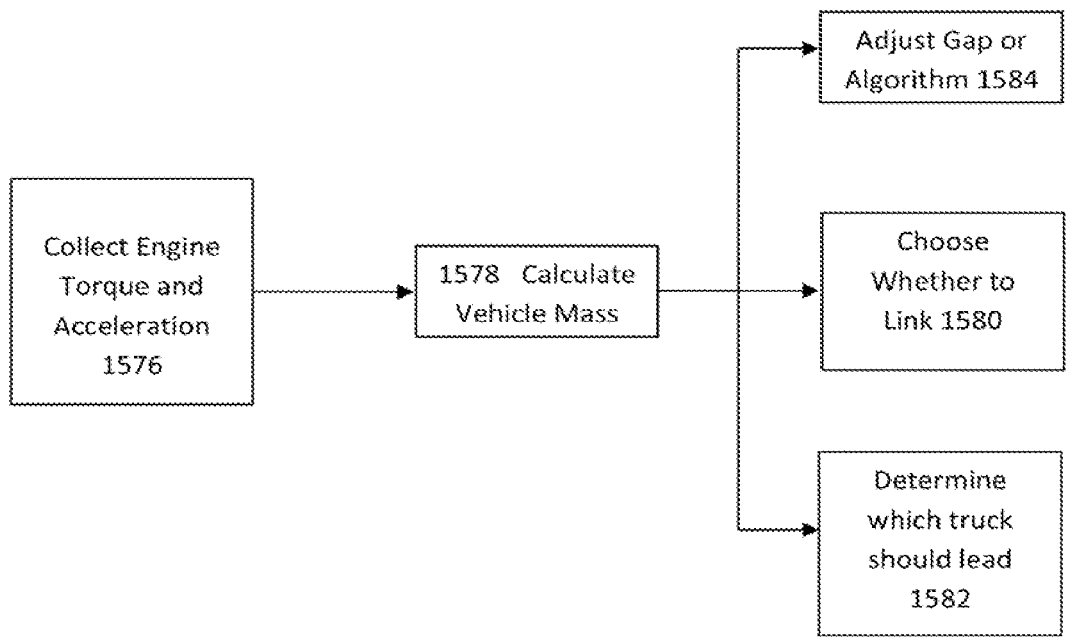
Figure 15B
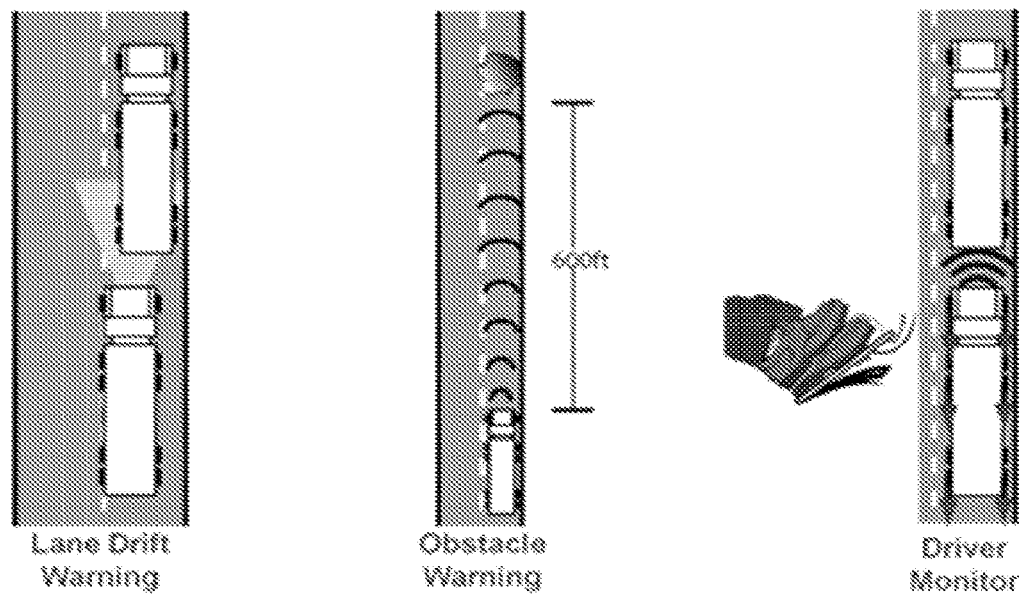
Figure 16A: Additional Features

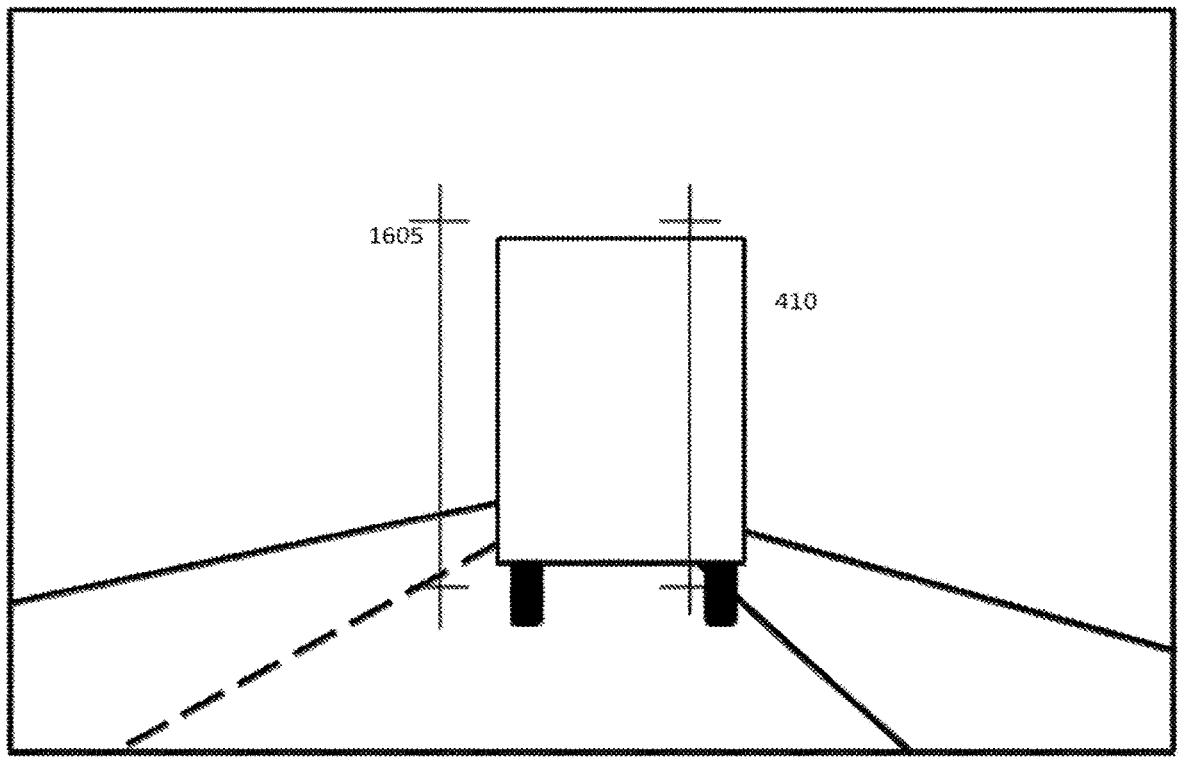
Figure 16B
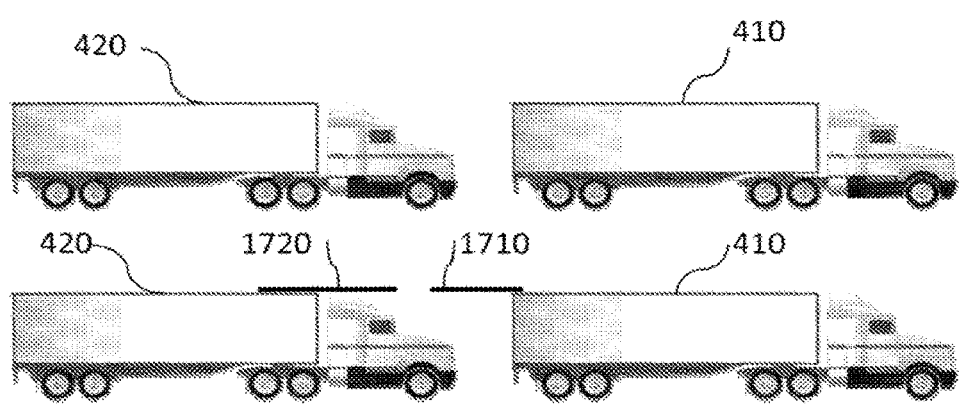
Figure 17: Possible Simplified Aerodynamic Optimization

VEHICLE PLATOONING SYSTEMS AND METHODS

CROSS-REFERENCE TO RELATED APPLICATIONS

This application is a continuation of U.S. application Ser. No. 15/589,124, filed May 8, 2017 which is a continuation of U.S. application Ser. No. 14/855,044, filed Sep. 15, 2015, which is a 371 of International Application PCT/US14/30770, filed Mar. 17, 2014, which in turn is a conversion of U.S. patent application Ser. No. 61/792,304, filed Mar. 15, 2013, and further is a continuation-in-part of Ser. No. 14/292,583 filed May 30, 2014, which is a Division of Ser. No. 13/542,622, filed Jul. 5, 2012, now U.S. Pat. No. 8,744,666, which in turn is a conversion of Provisional Application Ser. No. 61/505,076, filed on Jul. 6, 2011, both entitled "Systems and Methods for Semi-Autonomous Vehicular Convoying"; and which is also a Division of Ser. No. 13/542,627, filed Jul. 5, 2012, now U.S. Pat. No. 9,582,006, which in turn is also a conversion of Ser. No. 61/505,076, filed Jul. 6, 2011. Applicant claims the benefit of priority of each of the foregoing applications, all of which are incorporated herein by reference.

FIELD OF THE INVENTION

This application relates generally to safety and fuel savings systems for vehicles, and more particularly relates to systems and methods for enabling at least a second vehicle to follow, safely, a first vehicle at a close distance, where a plurality of safety features can be used singly or in combination. In addition, other aspects of the invention provide analytics useful for assessing driver performance and determining cost savings.

BACKGROUND

The present invention relates to systems and methods for enabling vehicles to closely follow one another safely through partial automation. Following closely behind another vehicle has significant fuel savings benefits, but is generally unsafe when done manually by the driver. On the opposite end of the spectrum, fully autonomous solutions require inordinate amounts of technology, and a level of robustness that is currently not cost effective.

Currently the longitudinal motion of vehicles is controlled during normal driving either manually or by convenience systems, and, during rare emergencies, it may be controlled by active safety systems.

Convenience systems, such as adaptive cruise control, control the speed of the vehicle to make it more pleasurable or relaxing for the driver, by partially automating the driving task. These systems use range sensors and vehicle sensors to then control the speed to maintain a constant headway to the leading vehicle. In general these systems provide zero added safety, and do not have full control authority over the vehicle (in terms of being able to fully brake or accelerate) but they do make the driving task easier, which is welcomed by the driver.

Some safety systems try to actively prevent accidents, by braking the vehicle automatically (without driver input), or assisting the driver in braking the vehicle, to avoid a collision. These systems generally add zero convenience, and are only used in emergency situations, but they are able to fully control the longitudinal motion of the vehicle.

Manual control by a driver is lacking in capability compared to even the current systems, in several ways. First, a manual driver cannot safely maintain a close following distance. In fact, the types of distance to get any measurable gain results in an unsafe condition, risking a costly and destructive accident. Second, the manual driver is not as reliable at maintaining a constant headway as an automated system. Third, a manual driver, when trying to maintain a constant headway, generally causes rapid and large changes in command (accelerator pedal position for example) which result in a loss of efficiency.

It is therefore apparent that an urgent need exists for reliable and economical Semi-Autonomous Vehicular Convoying. These improved Semi-Autonomous Vehicular Convoying Systems enable vehicles to follow closely together in a safe, efficient, convenient manner.

SUMMARY

The system and methods which form the invention described herein combines attributes of state of the art convenience, safety systems and manual control to provide a safe, efficient convoying, or platooning, solution. The present invention achieves this objective by combining elements of active vehicle monitoring and control with communication techniques that permit drivers of both lead and trailing vehicles to have a clear understanding of their motoring environment, including a variety of visual displays, while offering increased convenience to the drivers together with the features and functionality of a manually controlled vehicle.

To achieve the foregoing and in accordance with the present invention, systems and methods for a Semi-Autonomous Vehicular Convoying are provided. In particular the systems and methods of the present invention provide for: 1) a close following distance to save significant fuel; 2) safety in the event of emergency maneuvers by the leading vehicle; 3) safety in the event of component failures in the system; 4) an efficient mechanism for vehicles to find a partner vehicle to follow or be followed by; 5) an intelligent ordering of the vehicles based on several criteria; 6) other fuel economy optimizations made possible by the close following; 7) control algorithms to ensure smooth, comfortable, precise maintenance of the following distance; 8) robust failsafe mechanical hardware; 9) robust failsafe electronics and communication; 10) other communication between the vehicles for the benefit of the driver; 11) prevention of other types of accidents unrelated to the close following mode; and, 12) a simpler embodiment to enable a vehicle to serve as a lead vehicle without the full system.

It will be appreciated by those skilled in the art that the various features of the present invention described herein can be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of illustration, with reference to the accompanying drawings, in which:

FIG. 1 shows the airflow around a heavy truck, in accordance with some embodiments.

FIG. 2 shows US transportation fuel use.

FIG. 3A shows typical fleet expenses for a heavy truck fleet.

FIG. 3B shows typical heavy truck fuel use from aerodynamic drag.

FIGS. 7A-7C show an example of short range linking between two trucks, from available to linking to linked.

FIG. 8B illustrates a variety of factors that a central server might consider in determining candidates for linking.

FIG. 9A illustrates an embodiment of short range communications between trucks.

FIG. 9B illustrates the communications links which provide the short range communications of FIG. 9A.

FIG. 10 illustrates the establishment of a linked pair as the result of the short range communications between trucks.

FIG. 14 shows exemplary components for a simplified version of the embodiment of FIG. 12, suitable for a lead vehicle.

FIGS. 15A-B show, in flow diagram form, an embodiment of a process for coordination and linking in accordance with the invention, including consideration of factors specific to the vehicles.

FIGS. 16A-B show some additional safety features for some embodiments.

FIG. 17 shows one exemplary embodiment of aerodynamic optimization for use with convoying vehicles.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for a Semi-Autonomous Vehicular Convoying. Such a system enables vehicles to follow closely behind each other, in a convenient, safe manner. For convenience of illustration, the exemplary vehicles referred to in the following description will, in general, be large trucks, but those skilled in the art will appreciate that many, if not all, of the features described herein also apply to many other types of vehicles.

To facilitate discussion, FIG. 1 shows the airflow around a typical truck 100, illustrating both the relatively laminar airflow along the truck's roof and sides and the substantially turbulent flow at the rear of the truck. It will be appreciated by those skilled in the art that a vehicle's aerodynamic smoothness, related to the truck's frontal area and shape, affect total drag. The system of the present invention is aimed at reducing the drag caused by this type of airflow. This drag is responsible for the majority of fuel used in transportation, especially in the Heavy Truck sector (see FIG. 2). The expense of this fuel is significant for all private and industrial vehicle users, but especially so for heavy truck fleets, where the fuel is about 40% of operating expenses (see FIG. 3A). As shown in FIG. 3B, the wind resistance for a typical truck 100 is approximately 63% of engine power at highway speeds. This wind resistance power is approximately proportional to vehicle speed to the third power, as $Drag\_Power=Cd*(Area*0.5*density*Velocity \char`\^3)$, where Cd is the coefficient of drag and is a function of the object's shape.

Figure 4:
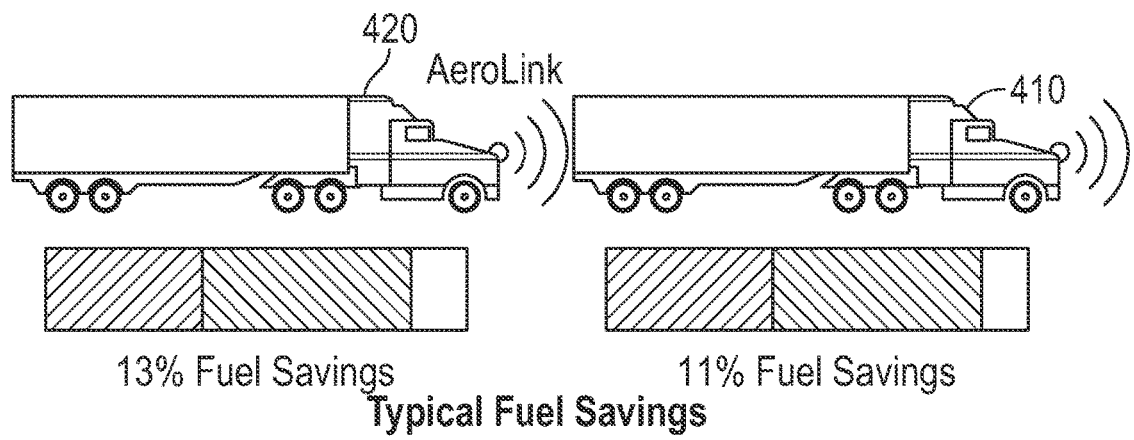
FIG. 4 shows typical fuel savings for a set of linked trucks.
Figure 5:
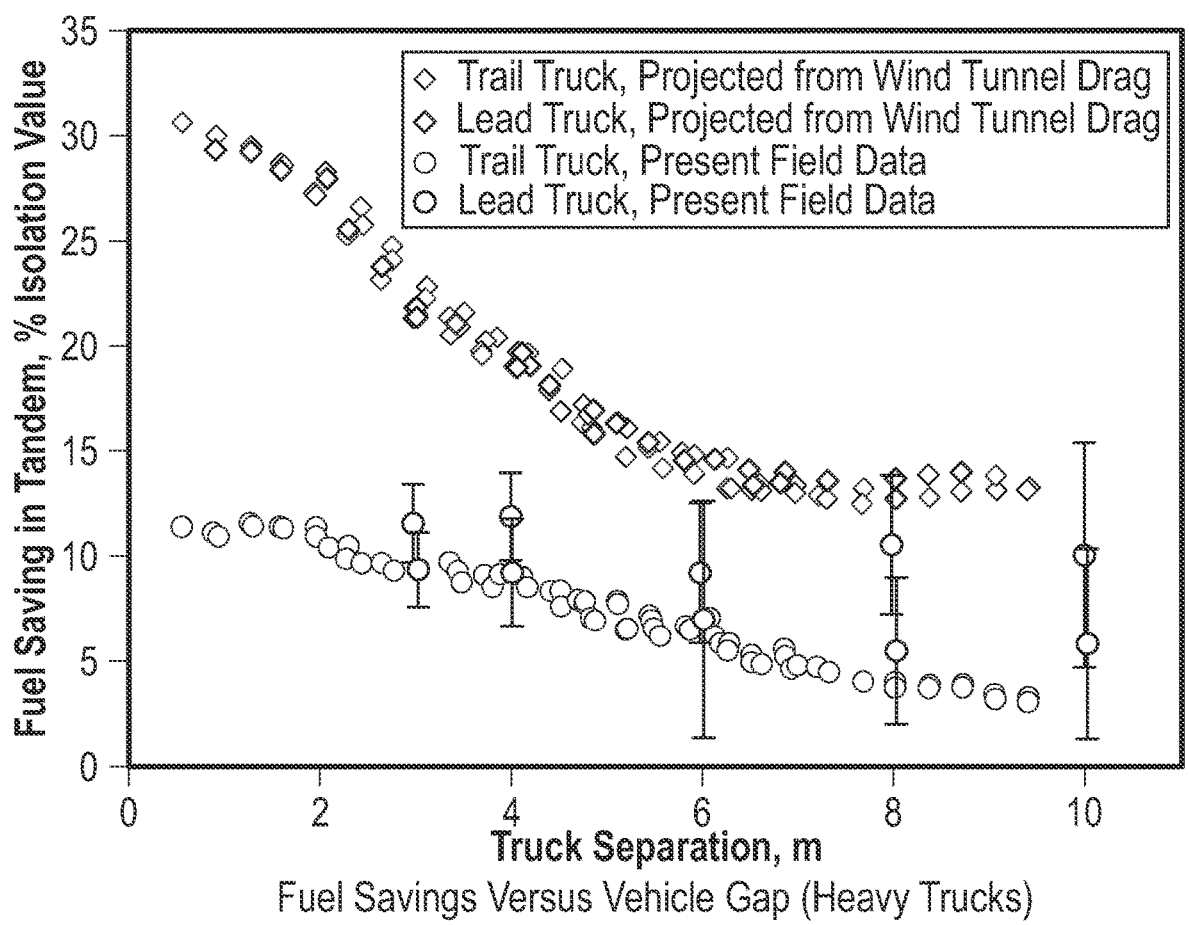
FIG. 5 shows fuel savings versus following distance gap for a set of heavy trucks.

Embodiments of the present invention enable vehicles to follow closely together and to achieve significant fuel savings, both for the lead and the trailing vehicles, as illustrated in FIG. 4 where two heavy trucks are shown following closely. FIG. 5 (from "Development and Evaluation of Selected Mobility Applications for VII (a.k.a. IntelliDrive)", Shladover 2009) shows the fuel savings possible for heavy trucks at various gaps.

Figure 6A:
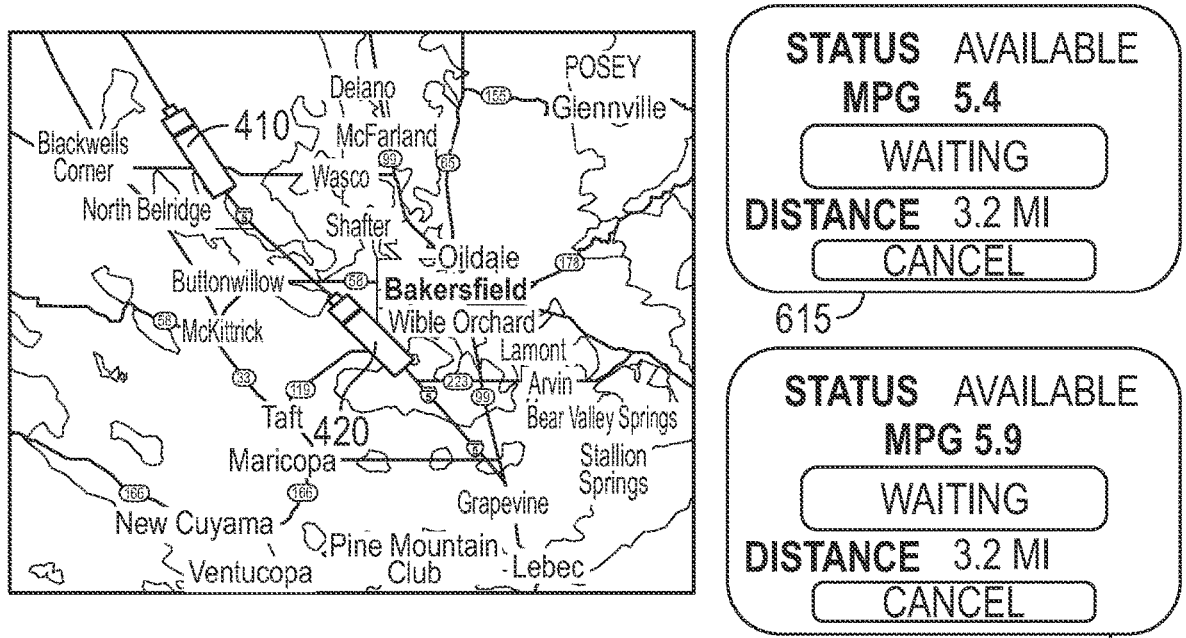
FIG. 6A shows an example of long range coordination between two trucks in accordance with one embodiment of the present invention.

In accordance with the present invention, a key part of the functionality of one such embodiment is long range coordination between the vehicles, which, in an embodiment, is managed from a central location, but, alternatively, can be initiated and managed by the truck drivers. As shown in FIG. 6A, this serves to allow vehicles 410 and 420 to find linking partners, where information concerning each truck such as shown as at 615 and 625, is available to, for example, the central location. In an embodiment, unique indicia, such as a serial number, is associated with each vehicle available for linking. The unique indicia can, in an embodiment, be unique among all vehicles that are potentially available for linking, whether or not available at a specific time and location; or, in an alternative embodiment, the indicia can be temporarily assigned, for example as part of the process of identifying and selecting candidates for linking, and can be unique only among vehicles that are candidates for linking at a particular time and location. In a still further alternative, the permanent or temporarily unique indicia can be assigned not only to vehicles available for linking, but to all vehicles proximate to vehicles having the system of the present invention, such that each such "neighboring" vehicle is monitored for movements that might require an evasive maneuver or other safety-related action. Such an arrangement provides improved situational awareness, and the movements of such other vehicles can be recorded for safety and liability purposes. In some embodiments, rear or side view cameras, lidar or radar can provide improved detection and monitoring of neighboring vehicles. The system has some knowledge of the location and/or destination of the self-vehicle and of other equipped vehicles on the road. The system can thus suggest nearby vehicles with which to link. Numerous other factors can also be taken into account before selecting trucks to link, as discussed hereinafter at least in connection with FIGS. 15A-C. The factors discussed in connection with FIGS. 15A-15C become relevant, the trucks must be traveling, or available to be coordinated to travel, on the same route, in an area where linking will provide the desired fuel savings and safety benefits. Thus, as shown in FIG. 6A, the two trucks are traveling on a stretch of major highway, both going the same direction, and neither is already linked. This provides, at least initially, some motivation to link the two trucks.

Figure 6B:
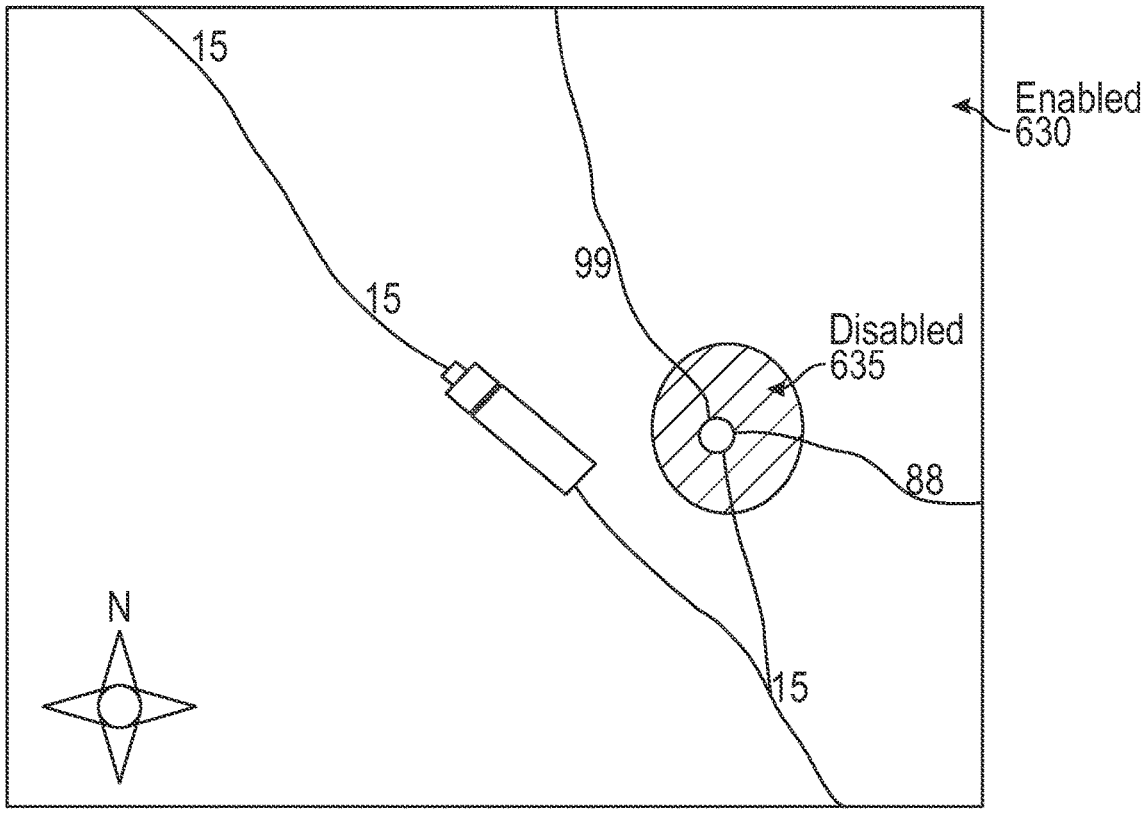
FIG. 6B illustrates the geofencing capability of the present invention.

However, some areas of roadways are not well-suited to linking. For example, and as shown in FIG. 6B, while the majority of a highway system may be adequate for enabling linking, indicated at 630, specific areas may be known to be undesirable for linking for one reason or another, and thus trucks in those areas are disabled from linking, indicated at 635. Problem areas, where linking is disabled, can result from, among other things, a grade or a downgrade, a city, lack of a divided highway or other adverse roadway characteristics, weather, military installations, RF or microwave interference, or, in some cases, low overpasses. For routes that include low overpasses, the central location can simply provide different routing for trucks too tall to clear. In the event that a too-tall truck ends up on a route with a low overpass, an embodiment of the present invention can apply brakes or otherwise generate a warning, as discussed in greater detail hereinafter in connection with FIG. 18.

Figure 7A:
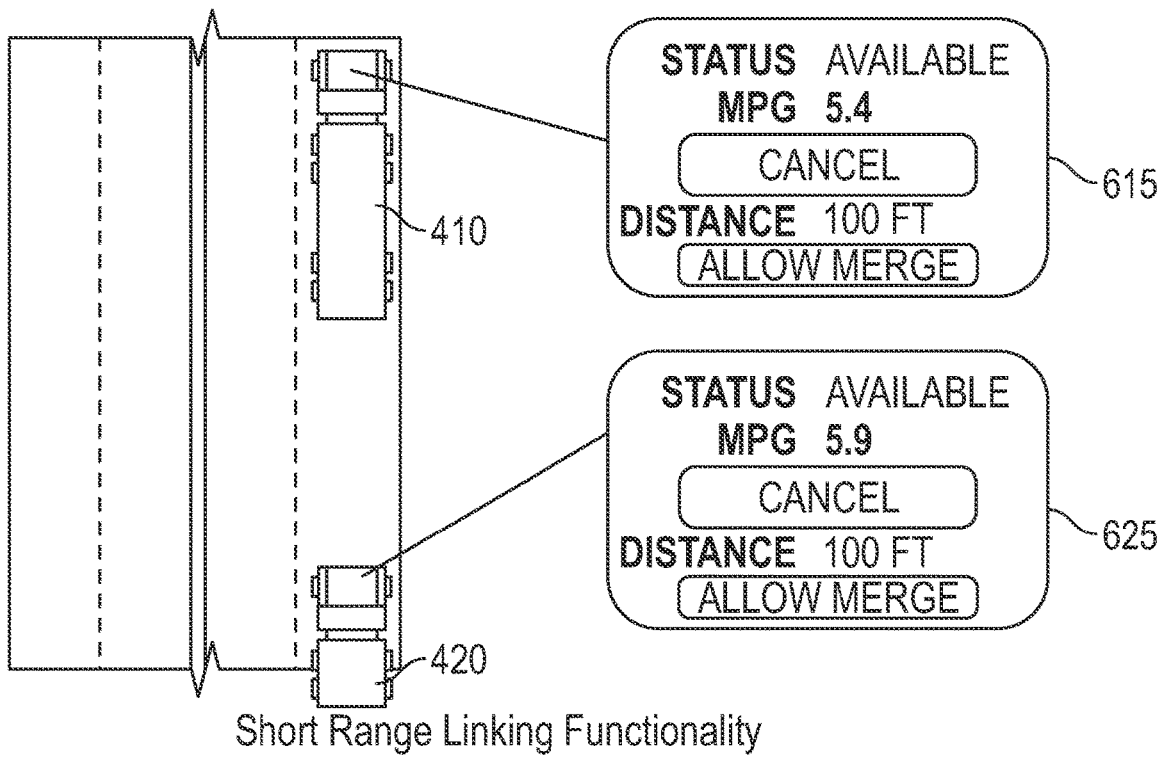

Should it be desirable for two trucks to link, the result is as shown in FIGS. 7A-7C, where trucks 410 and 420 move to within a few feet of each other, for example in the range of 10 feet to approximately 500 feet, and the displays 615 and 625 show that a merge is allowed and that the trucks are available for linking, then linking, and then linked. In an embodiment of the semi-autonomous system of the present invention, the trucks are brought generally proximate to one another through the coordination of a central system together with long range communication.

Figure 8A:
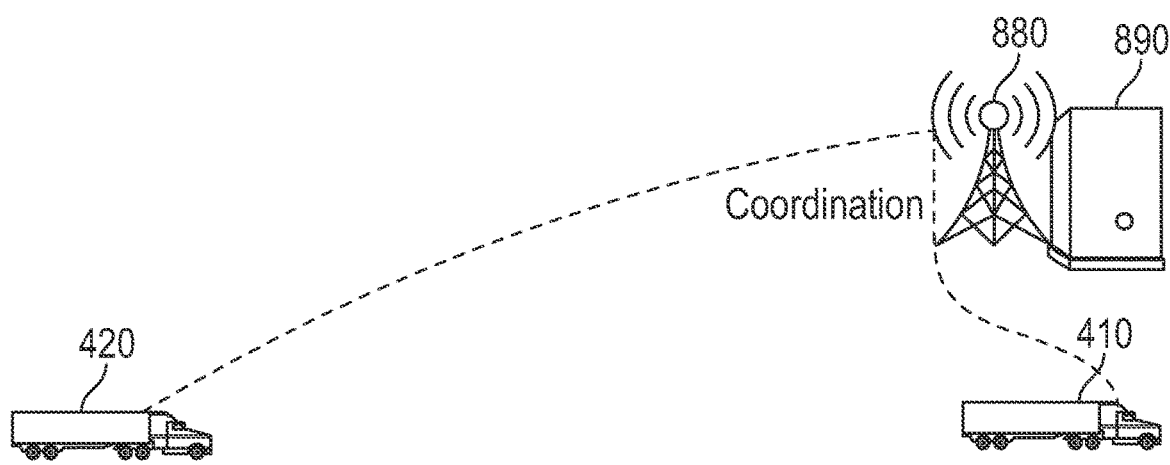
FIG. 8A illustrates exemplary long range communications between trucks.

FIGS. 8A-8B show the technology to enable such a system: in FIG. 8A, a long range communication system 880 and a central server 890 provide a communication link to each of trucks 410 and 420. As shown in FIG. 8B, the server 890 and/or the system onboard each vehicle 410, 420, makes decisions and suggestions based on knowledge of one or more of vehicle location, destination, load, weather, traffic conditions, vehicle type, trailer type, recent history of linking, fuel price, driver history, and other factors, all as shown at 830A-n. When a linking opportunity presents itself, the driver is notified via driver display 840, discussed in great detail in FIGS. 11A-B. At that point, the driver can manually adjust the vehicle speed to reduce the distance between the vehicles, or the system can automatically adjust the speed. In some instances, the central server or on-board systems will conclude that the pair is not suitable for linking, and linking is disabled as shown at 850.

These linking opportunities can also be determined while the vehicle is stationary, such as at a truck stop, rest stop, weigh station, warehouse, depot, etc. They can also be calculated ahead of time by the fleet manager or other associated personnel. They may be scheduled at time of departure, or hours or days ahead of time, or may be found ad-hoc while on the road, with or without the assistance of the coordination functionality of the system. In addition, linking of vehicles within a yard is also possible, and can improve traffic flow while reducing emissions even as vehicles operate at low speed.

The determination of which vehicle to suggest for linking may take into account several factors, and choose an optimum such as the vehicle which minimizes a cost function. For example, it may minimize a weighted cost function of the distance between the vehicles and the distance between their destinations: Optimum=$\min(W_p(Pos_a-Pos_b)^2+W_d(Des_a-Des_b)^2)$, where $W_p$ and $W_d$ are the weights on the two cost terms respectively. This cost function could have any of the factors listed above.

Once the two vehicles or drivers have decided to coordinate, either by choice or at the suggestion of the coordination functionality of the invention, they can manually adjust their speed, or it can be automatic. If manual, the system may suggest to the lead driver to slow down, and to the follower to speed up. Or if the leader is stationary (at a truck stop, rest stop, etc.), it may suggest that he delay his departure the appropriate amount of time. These suggestions may be based on vehicle speed, destination, driver history, or other factors. If the system automatically controls the speed, it may operate the truck in a Cruise Control or Adaptive Cruise Control type mode, with the speed chosen to bring the two vehicles closer together. The system may also operate in a semi-automatic mode, where it limits the speed of the leading vehicle, to bring them closer together.

In an embodiment, once the vehicles are sufficiently close together, communications between the vehicles is controlled locally, as shown in FIGS. 9A-B, rather than by the long range coordination system of FIG. 8A. This ensures more accurate control of relative speed and distance between the vehicles. In one implementation, each of trucks 410 and 420 has an on-board control processor 900 and associated communications interface 905. In addition, each vehicle senses various characteristics of vehicle performance, such as speed, relative distance to the other truck, braking application and/or pressure, engine or drivetrain torque, system faults, and other characteristics, and those characteristics are communicated as appropriate to the other control processor. In an embodiment, the control processor in the lead truck takes control of the rear vehicle 420 and controls it to a close following distance behind the front vehicle 410. Alternatively, and as discussed in more detail in connection with FIG. 13B, the control processor in the lead truck communicates its status to the control processor in the trailing truck, and vice versa, to cause the trucks to move into close proximity to one another while each remains under the control of its on-board control processor. In some embodiments, communications more critical to safety can be given prior over other types of communication among the vehicles. For example, brake application data or commands can be given priority over video transmission.

As a further alternative, one of the drivers may use an input to the system, which input can be by means of a touch sensitive display with a graphical user interface (GUI), for example, to activate this transition. As discussed above, key technology to allow this linking comprises primarily a distance/relative speed sensor, and a communication link. The type of functionality of this link is shown in FIG. 10, where information about a braking event is sent from the front vehicle 410 to the rear vehicle 420. Other information may include accelerometer data (filtered or unfiltered), brake pressure, tire pressure, information about obstacles or other vehicles in front of the lead truck. Also, any of the above data may be passed from the front truck 410 to the rear truck 420 that relates to trucks in front of the pair (for example, to allow safe platoons of three or more trucks.) During the linked, close-following mode, the system controls the engine torque and braking, with no driver intervention required. In some embodiments, the driver is still steering the vehicle; in others, autonomous steering can be used.

The linking event can comprise a smooth transition to the close distance following. This may take the form of a smooth target trajectory, with functionality in a controller that tries to follow this trajectory. Using $D_m$ as the safe relative distance in manual mode, and $D_a$ as the desired distance in semi-autonomous following mode, and a time $T_t$ for the transition to occur, the target distance may be $D_g = D_m + (D_a - D_m)*(1-\cos(pi*t/T_d))/2$ fort less than or equal to $T_d$. Thus in this way the change in gap per time is smallest at the beginning and the end of the transition, and largest in the middle, providing a smooth response. Other possible forms of this equation include exponentials, quadratics or higher powers, hyperbolic trigonometric functions, or a linear change. This shape can also be calculated dynamically, changing while the maneuver is performed based on changing conditions or other inputs.

The driver can deactivate the system in several ways. Application of the brake pedal can restore conventional manual control, or can trigger a mode where the driver's braking is simply added to the system's braking. Applying the accelerator pedal can also deactivate the system, returning to a manual mode. Other driver inputs that can trigger a system deactivation, depending upon the implementation, include: Turn signal application, steering inputs larger or faster than a threshold, clutch pedal application, a gear change, Jake (compression) brake application, trailer brake application, ignition key-off, and others. The driver can also deactivate the system by selecting an option on the GUI screen or other input device.

In the event of any system malfunction, including but not limited to component failures, software failures, mechanical damage, etc., the system may react in one of several safe ways. In general the trailing truck will reduce engine torque and/or start braking to ensure a safe gap is maintained. This braking may continue until the trailing truck has come to a complete stop, or it may continue only until a nominally safe distance is achieved (safe without automated control), or it may continue only until the malfunction has been identified. Additionally, one of several alerts may be used to notify the driver of the malfunction and subsequent action of the control system: A braking jerk, consisting of a small braking command, an audible tone, a seat vibration, a display on the GUI or other display, flashing the instrument cluster or other interior lights, increasing or decreasing engine torque momentarily, activation of the "Jake" (compression) brake, or other useful alerts.

Figure 11A:
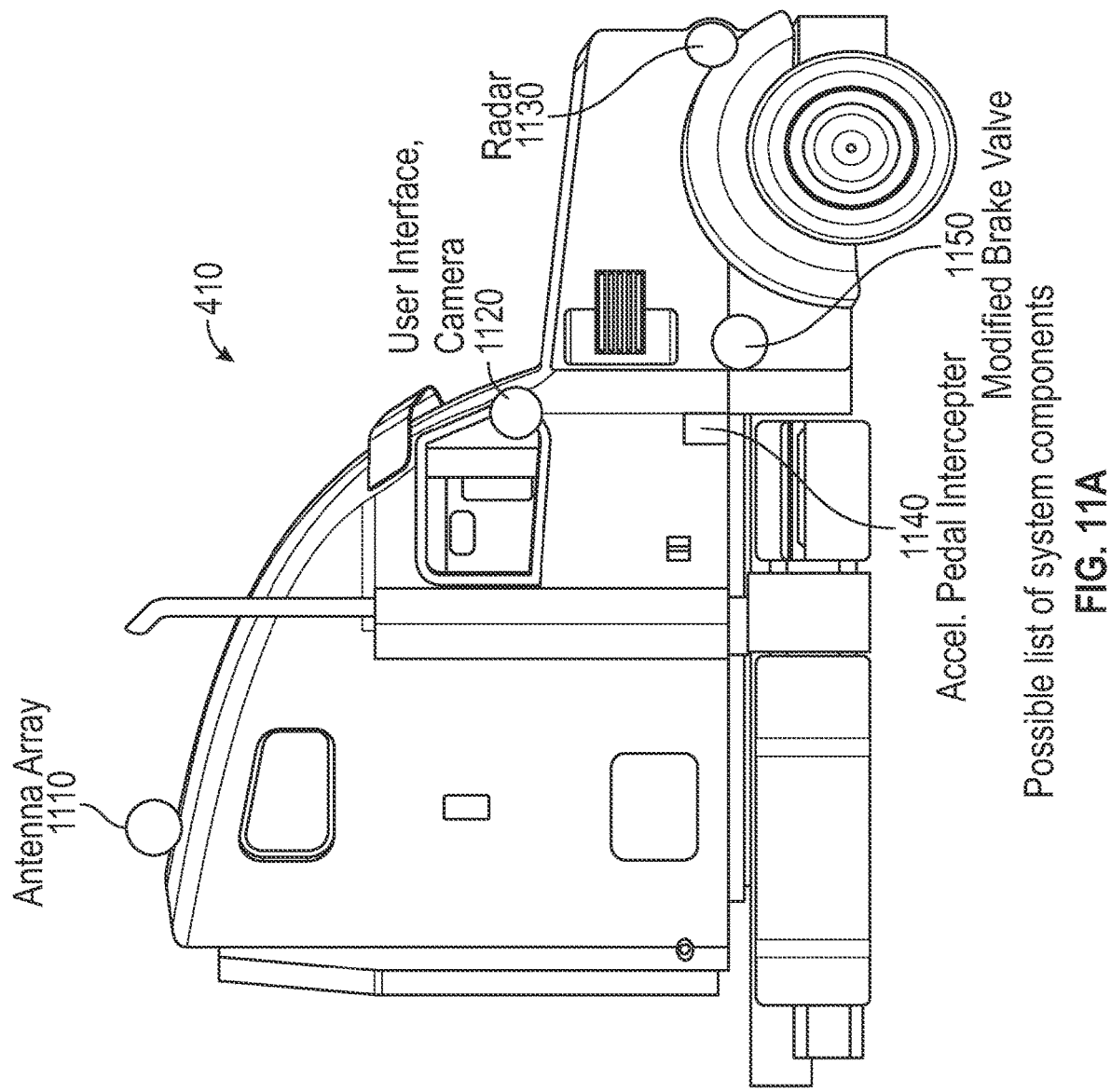
FIG. 11A shows an exemplary installation of system components for one embodiment of the invention.

To enable some or all of the described functionality, the system may have some or all of the following components shown in FIG. 11A: an accelerator pedal interceptor 1140, either on the communications and control bus found in most modern trucks, or sensed and modified as a range or set of analog voltages, to be used to command torque from the engine in a manner which resembles a highly refined cruise control; a modified brake valve 1150, which allows the system to command braking even in the absence of driver command; a forward-looking RADAR or LIDAR unit 1130 which senses distance to and relative speed with respect to the vehicle in front 410; a user interface 1120, which may also house a forward looking camera, by which the driver can interact with and control the system; an antenna array 1110, used for the short and long range communication systems; and a GPS receiver, which can be a precision GPS, differential GPS, or other GNSS device.

Figure 11B:
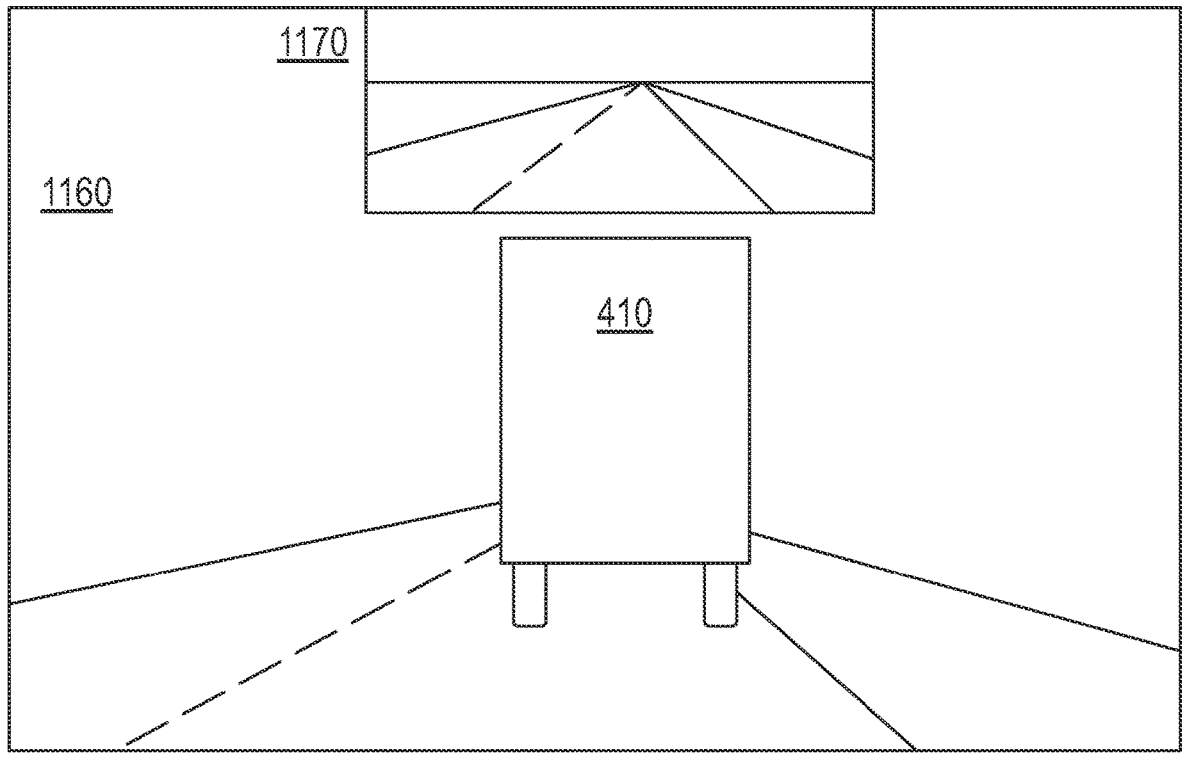
FIG. 11B shows an embodiment in which the view from a forward looking camera in a lead truck is displayed to the driver of a following truck.

The benefit of the forward looking camera, available either as part of interface 1120 or independently, provides a significant safety benefit, which can be appreciated from FIG. 11B. FIG. 11B shows, at 1160, the view seen by the driver of the trailing truck in a linked pair: the driver sees mostly the back of the lead truck, as well as some space to each side of the lead truck. However, in an embodiment, a display 1170 of the forward-looking camera 1120 in the lead truck is provided to the driver of the trailing truck, thus providing the driver of the trailing truck an unobstructed view of what is ahead of the linked pair of trucks. This permits the driver of the second truck to operate the trailing vehicle with the same knowledge of the road ahead as the lead vehicle, including observing unexpected developments, hazards, traffic, etc. The display 1170 can be visor or dash mounted, or in any other convenient location, and can also comprise a touch screen user interface, as discussed in greater detail in connection with FIG. 12.

Figure 12:
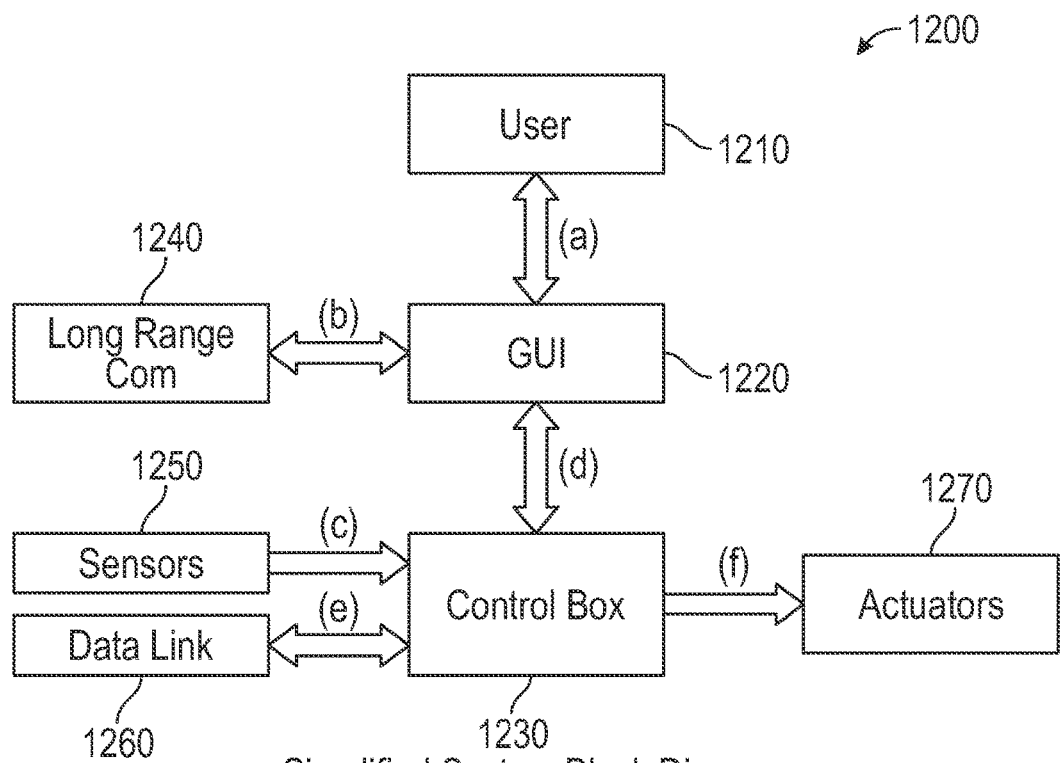
FIG. 12 illustrates, in simplified block diagram form, an embodiment of a vehicular convoying control system in accordance with the present invention.

FIG. 12 shows the system architecture for one embodiment 1200. The user 1210 interacts with the system through a user interface, which may be a Graphical User Interface 1220, and which is typically, although not necessarily, integrated with a control processor 1230. Alternatively, the user interface can comprise an additional electronics unit, such as a tablet-style computer which can be mounted in any convenient location, such as the dash or the visor. Such tablets typically include graphical user interfaces, although such an interface is not necessary and any convenient interface will do. Such tablets often also include a cellular modem, thus permitting long range communications and coordination, as well as a GPS. In some implementations, these features can be provided separately. For purposes of simplicity in the present disclosure, it will be assumed that the user interface 1220 is a tablet with such features, including a graphical user interface and touch screen. In an alternative embodiment, a smartphone can be substituted for the tablet. In other embodiments, the processing capability required by the system of FIG. 12 can be provided by the tablet or smartphone. In appropriate embodiments, such tablets or smartphones can serve as the core controller, the user interface panel, or can provide some or all of the vehicle-to-vehicle link through either cellular connectivity, Bluetooth, WiFi, or other suitable connection. Such devices can also be connected to the rest of the system, such as a CAN or J1939 bus, or vehicle ECU's.

The user 1210 receives information (a) from visual and or auditory alerts, and can make system requests (e.g., for linking or coordination). The user interface 1220 communicates with a long range data link 1240 (b), such as through a cellular modem or other service. The user interface 1220 is responsible for managing this data link, sending data via the link, and receiving data via the link. A control processor 1230 (which may be alternatively integrated with the GUI box) receives sensor information 1250 (c), short range data link 1260 information (e), and controls the actuators 1270 (f). It receives information from the user interface 1220 via a wired or wireless link (d), and sends information to the user interface 1220 to be relayed to the driver and/or long range communication link 1240. Alternately, the long range communication link 1240 can connect directly to the control box 1230. In this case, the user interface 1220 may be an extremely simple (low cost) device, or may even be eliminated from the system entirely.

Figure 13A:
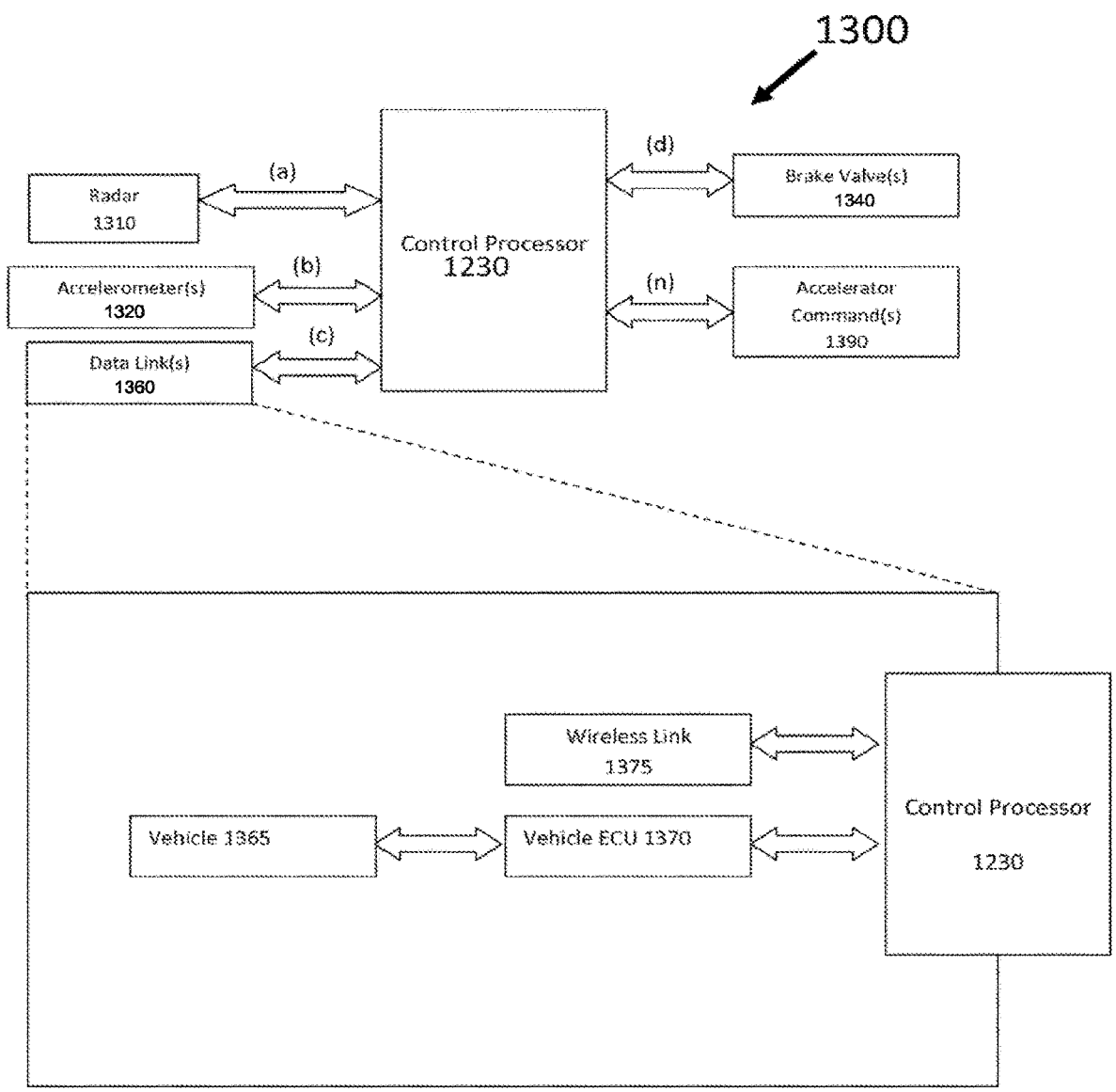
FIGS. 13A-B illustrate, in greater detail than FIG. 12, the components of the control system which cooperate with the control processor of FIG. 12.
Figure 13B:
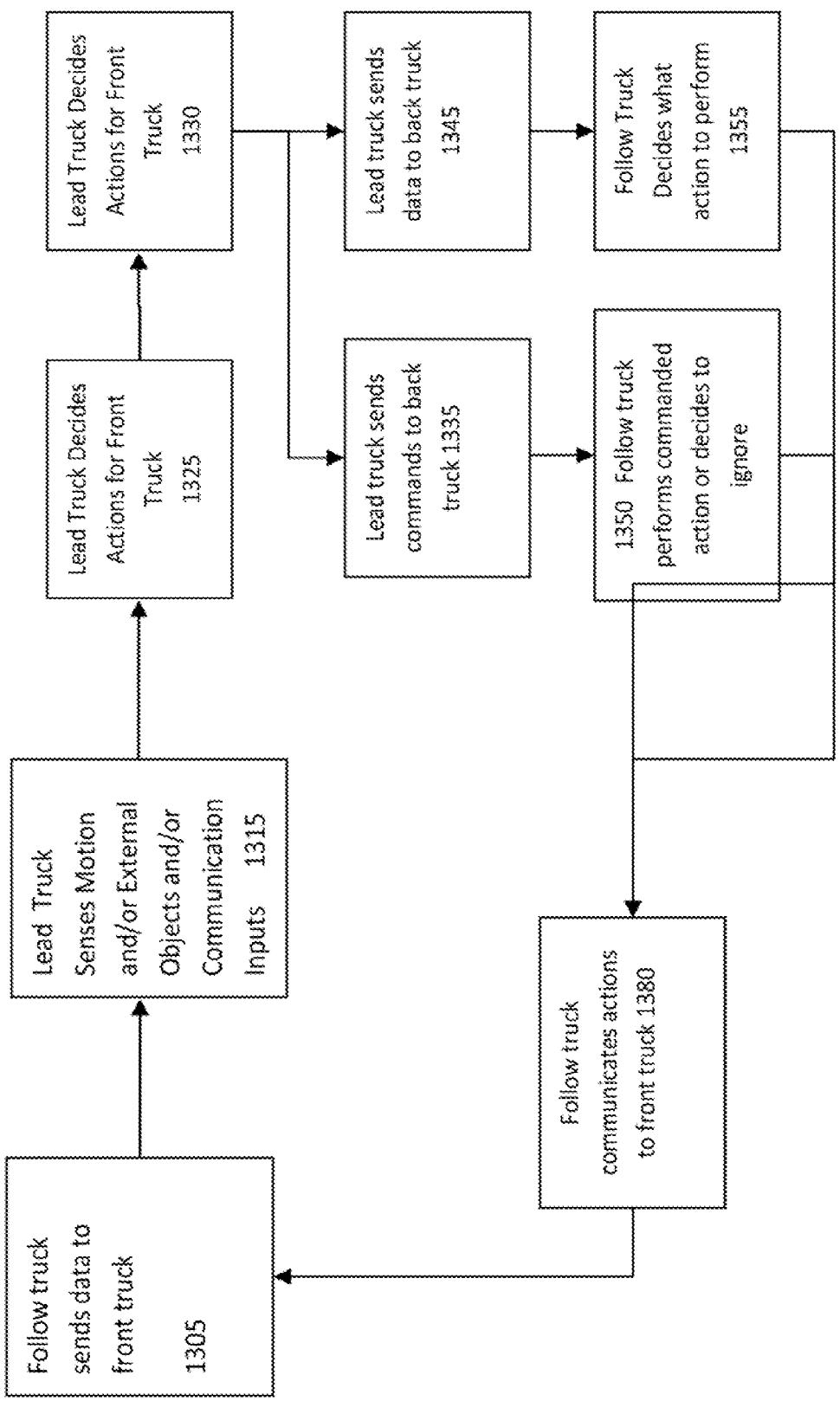

FIG. 13A shows one embodiment of a vehicle control unit 1300 in accordance with the present invention while FIG. 13B shows in process flow form the exchange of information between the vehicle control units 1300 of both the lead and trailing trucks. In particular, and with reference to FIG. 13A, the unit 1300 comprises at least one control processor 1230, which communicates with various core sensors such as radar/lidar 1310, accelerometers 1320, data links 1360, and also communicates with actuators such as brake valve 1340 and accelerator command unit 1390. Via connection (a), typically but not necessarily a CAN interface, the control processor 1230 configures the radar unit 1310 and receives data. Connection (b) to accelerometers 1320, which can be wireless, gives the control box acceleration information in 1, 2 or 3 axes as well as rotation rate information about 1, 2 or 3 axes. In some embodiments, gyros can be substituted for accelerometers, especially for, for example, rotation rate. The data link 1360, shown at (c) and illustrated in greater detail below as indicated by the dashed lines, provides information about relevant characteristics of the leading truck 410, including its acceleration, or is used to provide the same or similar information to a following truck 420. The brake valve 1340 (d) provides data on brake pressure, and is used to apply pressure via a command from the control processor 1230. The accelerator command 1390 is sent via an analog voltage or a communications signal (CAN or otherwise). The control processor performs calculations to process the sensor information, information from the GUI, and any other data sources, and determine the correct set of actuator commands to attain the current goal (example: maintaining a constant following distance to the preceding vehicle). The data links 1360 can comprise a link to the truck manufacturer's engine control unit 1370, a wireless link 1375 for communications and a link to other aspects of the vehicle as shown at 1365. Each of these links can, depending upon the embodiment, be bidirectional.

The operation of the vehicle control unit 1300 of the present invention can be better appreciated from FIG. 13B, which shows, for an embodiment, the general flow between the vehicle control units 1300 of two linked vehicles. Two modes of operation are possible: in a first mode, the front truck's control unit 1300 issues commands to the back truck's control unit, and those commands are, in general, followed, but can be ignored in appropriate circumstances, such as safety. In a second mode, the front truck's control unit sends data to the second truck, advising the trailing truck of the data sensed by the lead truck and the actions being taken by the lead truck. The second truck's control unit then operates on that data from the front truck to take appropriate action. As shown at 1305, the following or trailing truck sends data about its operation to the front or lead truck. At 1315, the lead truck receives the data from the trailing truck, and senses motion and/or external objects and/or communication inputs. The lead truck then decides upon actions for the lead truck, shown at 1325, and, if operating in the first mode, also decides upon actions for the back truck, shown at 1330. Then, depending upon whether operating in first or second mode, the lead truck either sends commands (1335) to the trailing truck (first mode), or sends data (1345) to the trailing truck (second mode). If operating in the first mode, the second truck receives the commands and performs them at 1350, with the caveat that the second truck can also chose to ignore such commands in some embodiments. If operating in the second mode, the second truck receives the data at 1355, and decides what actions to perform. Because the control programs for both units 1300 are the same, in most cases the resulting control of the second truck will be identical regardless of operating mode. Finally, the second truck communicates to the front truck what actions it has taken, so that each truck knows the state of the other. In at least some embodiments, this process is repeated substantially continually to ensure that each truck has the current state of the other truck, thus ensuring safe and predictable operation of each truck, even when operating in close-order formation at highway speeds.

FIG. 15A shows one embodiment of the coordination and linking functionality. First, the system identifies a vehicle available for coordination 1510 (example: within a certain range, depending on the route of the two vehicles). Once one of the vehicles has accepted 1522 or 1524, the other can then accept, meaning that the pair has agreed to coordinate for possible linking 1530. Depending on vehicle positioning, weight of load, vehicle equipment, and other factors, a vehicle within linking range may be identified as a Following Vehicle Available for Linking 1542 or a Leading Vehicle Available for Linking 1544. If neither of these is the case, the system returns to coordination mode. Once a Following Vehicle Available for Coordination has Accepted the link 1552, the Self Vehicle then also accepts the link 1553, initiating the link. Upon completion of the link, the vehicles are now linked 1562. Similarly, once a Leading Vehicle Available for Coordination has Accepted the link 1554, the Self Vehicle then also accepts the link 1555, initiating the link. Upon completion of the link, the vehicles are now linked 1564.

FIG. 15B illustrates an embodiment of a process by which the vehicle mass of the truck is taken into account to determine whether a particular truck pair is suitable for linking and, if so, which truck should lead, and at what gap. In FIG. 15B, engine torque and acceleration are sensed at 1576. Because, in at least some embodiments, the vehicle control unit 1300 knows a variety of details about the truck on which the system is installed (including either torque, engine speed, and acceleration, or power and acceleration) the engine torque and acceleration permits vehicle mass to be calculated, shown at 1578. Based upon that calculation for each truck in the pair, the trucks are determined either to be suitable for linking, or not. If they are suitable for linking, shown at 1580, a determination as to which truck should lead is made at 1582, using the factors mentioned above. In some instances, the characteristics of the truck, such as load, etc., may cause the control units 1300 of the respective trucks to adjust the gap between the trucks, or the algorithm by which distance is adjusted with speed, as shown at 1584. Other operating characteristics that can, depending upon the embodiment, influence the adjustment of distance can include type of brakes installed, recent brake use, time/distance since maintenance, tire life, type of tires, and temperature. Further, if an exit, interchange, or other road feature or condition is encountered, or is being approached (for example, as detected by vehicle sensors or communicated from an external source such as the fleet office) then the distance can be increased to provide visibility to the rear driver. Additionally for an upcoming exit the rear truck or both trucks can be set to coast to avoid braking at the off-ramp. In some embodiments, the following distance can also be adjusted based on other upcoming features of the road or greater environment, to ensure safety, make the driver more comfortable, or for other reasons. Dangerous low overpasses, inspection stations, road grade, or areas identified as dangerous, can all be used to adjust the following distance. These features can be identified from map data, internet data, or other source. Other features can be detected by either or both trucks, either from their on-board sensors, or from the sensors added for the system. These include upcoming road curvature, current or upcoming road grade. Current or upcoming traffic can also be identified through radar sensors, the internet, machine vision, or other methods. In some embodiments, the following distance can also be set based on driver activity. A lack of steering input can signify inattention and cause an increase in following distance. Similarly, aggressive behavior, shown by aggressive motion of the steering wheel, pedals or other input, can be used to set a desired distance. The turn signal can also change the distance, for example to allow space between the vehicles for exiting the road. The driver can also select the following distance in some embodiments. Still further, the current fuel economy, the amount of fuel onboard, the projected range, or other fuel-related parameters may be used to set the following distance. For example the driver may want to follow more closely when the fuel level is low, to help reach a destination. As another example, the fleet or the driver may have a target fuel economy, and the adjustment of following distance can be used to meet this target, within limits appropriate to ensuring safety.

In the event the leading vehicle 410 is required to make emergency maneuvers, safety is ensured by the use of the communications link between the two vehicles. This link may send some or all of the following: Brake application pressure, brake air supply reservoir pressure, engine torque, engine RPM, compression (Jake) brake application, accelerator pedal position, engine manifold pressure, computed delivered torque, vehicle speed, system faults, battery voltage, vehicle acceleration, driver inputs, diagnostic information, braking system condition, and radar/lidar data.

The data link 1260 has very low latency (approximately 10 ms in one embodiment), and high reliability. This could be, but is not limited to, WiFi, DSRC (802.11p), radio modem, Zigbee, or other industry standard format. This link could also be a non-industry-standard format. In the event of a data link loss, the trailing vehicles are typically instructed to immediately start slowing, to ensure that if the front vehicle happens to brake immediately when the link is lost, the gap can be maintained safely.

In addition to safe operation during the loss of the data link 1260, the system should be safe in the event of failure of components of the system. For most failures, the trailing vehicles 420 start braking, until the driver takes control or other sensors determine that the situation is safe at which point braking can be decreased as appropriate. This ensures that, in the worst case where the front vehicle 410 starts to brake immediately when a system component fails, the system is still safe. The modified brake valve 1340 is also designed such that in the event of a complete failure, the driver can still brake the vehicle.

Ordering of the vehicles: In an embodiment, the system arranges the vehicles on the road to ensure safety. This order may be determined by vehicle weight/load, weather/road conditions, fuel savings or linking time accrued, braking technology on the vehicle, destination or other factors. In such an embodiment, the system will (graphically or otherwise) tell the drivers which vehicle should be in the front. For example, to mitigate fatigue, the system may cause the trucks to exchange positions on a periodic basis. In embodiments where order is important, such as heavy trucks, the system will only perform the linking functionality if the vehicles are in the correct order. The order may be determined by relative positioning measures like GPS, directional detection of the wireless communication, driver input, visual (video or still image) processing, or direct or indirect detection of aerodynamics through fuel savings or sensors. In another embodiment, the system can apply steering or other lateral control, combined with control of engine torque and braking, if needed, to effectuate the desired order of the vehicles.

FIG. 16A shows some additional safety features the system may have to prevent other types of accidents unrelated to the close following mode. One such feature is to use the video stream from the front looking camera to detect drifting within or out of the lane. This is done by looking at the edges or important features on the leading vehicle 410, and calculating the lateral offset from that vehicle. When it is detected, the system can react with a braking jerk (a short braking application to get the driver's attention), slowing down, or a braking jerk in the leading vehicle. Alternatively, and as shown in FIG. 16B, a set of registration marks 1605 can be provided on a display for the driver of the trailing rig, to permit optimum longitudinal registration between the vehicles. In embodiments having video, portions of the video that are not important, or change less frequently, can be highly compressed or not transmitted at all. For example, when trucks are linked, the back of the lead vehicle does not change significantly, and is not critical. The compression can be varied based on known or commanded movement of the vehicles. For example if it is known that the vehicles have relative motion laterally, then the image can be shifted laterally in an efficient way without sending the raw video.

The system can also use the front mounted radar to detect obstacles or stationary vehicles in the road, even when not in close-following mode. When these are detected, it can apply a braking jerk, slow the vehicle, or provide visual or auditory warnings. The system can also use the accelerator pedal signal to determine when the driver is not engaged with the vehicle (or other driver states) and react accordingly, such as slowing the vehicle or disabling the system. These and other warnings and alerts are discussed hereinafter in connection with FIG. 18.

To facilitate rapid deployment, a simpler version of the system enables vehicles to be a leading vehicle, shown in FIG. 14. The components on this version are a subset of those on the full system, so there is no automation. There are several embodiments of this reduced set of functionality, with different subsets of the components from the full system. One minimal system simply performs two functions: Transmits sufficient data to the trailing vehicle to allow close following, and alerts the front driver to a linking request and allows him/her to accept or decline it. As such, this version has only the data link functionality 1460. It connects to the brake pressure sensor and electrical power. This system may also have additional components, including an accelerometer 1450 and/or an extremely simply user interface and/or long range data communication 1440.

The full system may also provide other fuel economy optimizations. These may include grade-based cruise control, where the speed set-point is determined in part by the grade angle of the road and the upcoming road. The system can also set the speed of the vehicles to attain a specific fuel economy, given constraints on arrival time. Displaying the optimum transmission gear for the driver 1410 can also provide fuel economy benefits.

The system may also suggest an optimal lateral positioning of the trucks, to increase the fuel savings. For example, with a cross wind, it may be preferable to have a slight offset between the trucks, such that the trailing truck is not aligned perfectly behind the leading truck. This lateral position may be some combination of a relative position to the surrounding, truck(s) or other vehicles, position within the lane, and global position. This lateral position may be indicated by the registration marks 1605.

The data link between the two vehicles is critical to safety, so the safety critical data on this link has priority over any other data. Thus the link can be separated into a safety layer (top priority) and a convenience layer (lower priority). The critical priority data is that which is used to actively control the trailing vehicle. Examples of this may include acceleration information, braking information, system activation/deactivation, system faults, range or relative speed, or other data streams related to vehicle control. The selection of which data is high priority may also be determined, in whole or in part, by the data being sent and/or received. For example in an emergency braking situation, additional data may be included as high priority.

The lower priority convenience portion of the link can be used to provide data, voice or video to the drivers to increase their pleasure of driving. This can include social interaction with the other drivers, or video from the front vehicle's camera to provide a view of the road ahead. This link can also be used when the vehicle is stationary to output diagnostic information gathered while the vehicle was driving. In addition, other cameras, and thus other views, can be provided, including providing the driver of the lead truck with a view from the forward-looking camera on the trailing rig, or providing both drivers with sufficient camera views from around each vehicle that all blind spots are eliminated for each driver.

Because the system is tracking the movements of the vehicles, a tremendous amount of data about the individual vehicles and about the fleet is available. This information can be processed to provide analysis of fleet logistics, individual driver performance, vehicle performance or fuel economy, backhaul opportunities, or others. These and other features are discussed hereinafter in connection with FIGS. 20A-B.

In an embodiment, the system includes an "allow to merge" button to be used when the driver wants another vehicle to be able to merge in between the two vehicles. The button triggers an increase in the vehicle gap to a normal following distance, followed by an automatic resumption of the close following distance once the merging vehicle has left. The length of this gap may be determined by the speed of the vehicles, the current gap, an identification of the vehicle that wishes to merge, the road type, and other factors. The transition to and from this gap may have a smooth shape similar to that used for the original linking event. Using $D_v$ as the relative distance to allow a vehicle to cut in, and $D_a$ as the desired distance in semi-autonomous following mode, and a time Tt for the transition to occur, the target distance may be $D_g = D_a + (D_v - D_a)*(1 - \cos(pi*/T_d))/2$ for t less than or equal to $T_d$.

For vehicles without an automatic transmission, the system can sense the application of the clutch pedal by inferring such from the engine speed and vehicle speed. If the ratio is not close to one of the transmission ratios of the vehicle, then the clutch pedal is applied or the vehicle is in neutral. In this event the system should be disengaged, because the system no longer has the ability to control torque to the drive wheels. For example this calculation may be performed as a series of binary checks, one for each gear: Gear_1=abs(RPM/WheelSpeed−Gear1Ratio)<Gear1Threshold and so on for each gear. Thus if none of these are true, the clutch pedal is engaged.

The system can estimate the mass of the vehicle to take into account changes in load from cargo. The system uses the engine torque and measured acceleration to estimate the mass. In simplest form, this says that M_total=Force Wheels/Acceleration. This may also be combined with various smoothing algorithms to reject noise, including Kalman filtering, Luenberger observers, and others. This estimate is then used in the control of the vehicle for the trajectory generation, system fail-safes, the tracking controller, and to decide when full braking power is needed. The mass is also used to help determine the order of the vehicles on the road.

Many modifications and additions to the embodiments described above are possible and are within the scope of the present invention. For example, the system may also include the capability to have passenger cars or light trucks following heavy trucks. This capability may be built in at the factory to the passenger cars and light trucks, or could be a subset of the components and functionality described here, e.g., as an aftermarket product.

The system may also include an aerodynamic design optimized for the purpose of convoying, as shown in FIG. 17. This may be the design of the tractor or trailer, or the design of add-on aerodynamic aids that optimize the airflow for the convoy mode. This design may correspond to a specific speed, at which the airflow will be optimized for the convoy mode.

For example, a hood may deploy, e.g., slide forward, from the roof of the follower vehicle. Portions of the hood may be textured (like an aerodynamic golf ball surface) or may be transparent so as not to further obscure the follower driver's view. In another example, the existing aerodynamic cone of a follower truck may be repositioned, and/or the cone profile dynamically reconfigured, depending on vehicular speed and weather conditions. This aerodynamic addition or modification may be on the top, bottom, sides, front, or back of the trailer or tractor, or a combination thereof.

This aerodynamic design may be to specifically function as a lead vehicle 1710, specifically as a following vehicle 1720, or an optimized combination of the two. It may also be adjustable in some way, either automatically or manually, to convert between optimized configurations to be a lead vehicle, a following vehicle, both, or to be optimized for solitary travel.

The data link between the two vehicles may be accomplished in one of several ways, including, but not limited to: A standard patch antenna, a fixed directional antenna, a steerable phased-array antenna, an under-tractor antenna, an optical link from the tractor, an optical link using one or more brake lights as sender or receiver, or others. In at least some embodiments, it is desirable to ensure that a line of sight is maintained between the antenna of the lead and following truck, for those types of communication that require it. Multiple antennas can be used in such embodiments, by, for example using one antenna on each side mirror of the vehicle, such that one of these antennas is usually in line of sight to an antenna on the other vehicle. The selection between the available antennas can be done based on detected signal strength, for example. In a platooning or automated system, the optimal antenna can be predicted through knowledge of the motion of the vehicles, the commanded motion, or knowledge of the surrounding vehicles, either from sensing or from communication. In some embodiments, the placement of antennas on the vehicle may be chosen specifically for platooning. For example if the predetermined distance between the vehicles is known to be twenty feet, the antenna placement may be chosen to ensure that line of sight is maintained at a twenty foot spacing. It is also possible to command, through the vehicle control unit, that the vehicles maintain a line of sight.

Such an approach can be combined with other factors, for example sidewind, to determine an overall optical relative position between the vehicles. The phase lock loop in the communications module can be fed the commanded motion of one or more vehicles, to help predict the Doppler shift.

The data link, or other components of the system, may be able to activate the brake lights, in the presence or absence of brake pedal or brake application.

Other possible modifications include supplemental visual aids for drivers of follower vehicles, including optical devices such as mirrors and periscopes, to enable follower drivers to get a better forward-looking view which is partially obscured by the lead vehicle.

Any portion of the above-described components included in the system may be in the cab, in the trailer, in each trailer of a multi-trailer configuration, or a combination of these locations.

The components may be provided as an add-on system to an existing truck, or some or all of them may be included from the factory. Some of the components may also be from existing systems already installed in the truck from the factory or as an aftermarket system.

The present invention is also intended to be applicable to current and future vehicular types and power sources. For example, the present invention is suitable for 2-wheeler, 3-wheelers, 4 wheelers, 6 wheelers, 16-wheelers, gas powered, diesel powered, two-stroke, four-stroke, turbine, electric, hybrid, and any combinations thereof. The present invention is also consistent with many innovative vehicular technologies such as hands-free user interfaces including head-up displays, speech recognition and speech synthesis, regenerative braking and multiple-axle steering.

Figure 18:
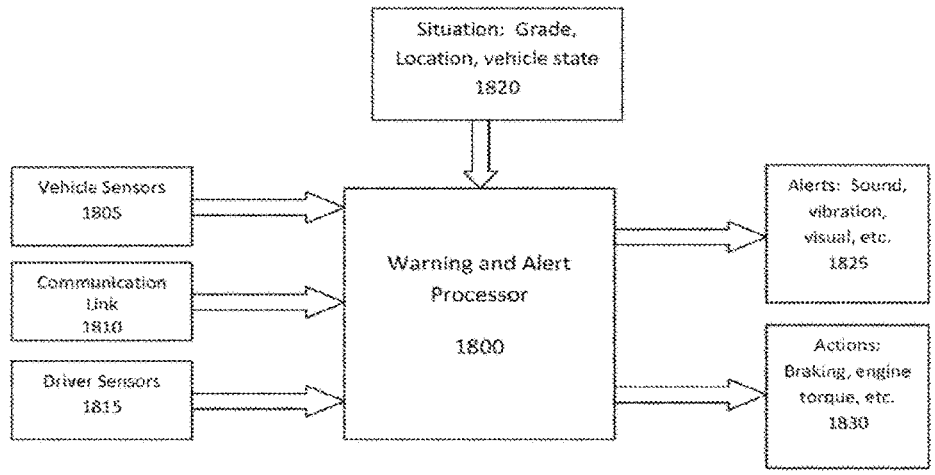
FIG. 18 illustrates additional safety features provided by an embodiment of the present invention, and particularly warnings and alerts.

The system may also be combined with other vehicle control systems such as Electronic Stability Control, Parking Assistance, Blind Spot Detection, Adaptive Cruise Control, Traffic Jam Assistance, Navigation, Grade-Aware Cruise Control, Automated Emergency Braking, Pedestrain detection, Rollover-Control, Anti-Jacknife control, Anti-Lock braking, Traction Control, Lane Departure Warning, Lane-keeping Assistance, Sidewind compensation. It may also be combined with predictive engine control, using the command from the system to optimize future engine inputs. With reference to FIG. 18, an embodiment by which such warnings and alerts are generated in accordance with the invention can be better appreciated. A warning and alert processor 1800, which can either be integrated with the control processor 1230 or be a separate processor, receives inputs from the vehicle sensors 1805, as well as the short range communication link 1810, and various driver sensors 1815 including, for example, a sobriety sensor. In addition, the processor 1800 receives input concerning the location on the road, any applicable grade, and the state of the vehicle, as shown at 1820. If an unacceptable condition exists, the processor 1800 either causes an alert 1825, which can take the form of sound, vibration, a visual display, or some other signal intended to be immediately noticed by the driver, or the processor causes an action 1830, such as braking and/or reduction in engine torque.

Figure 19:
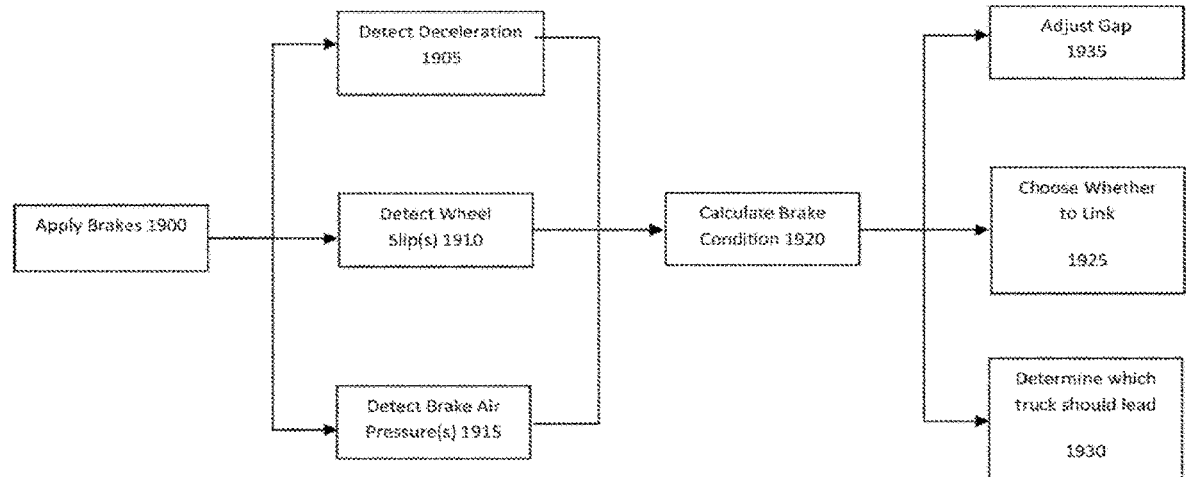
FIG. 19 illustrates a brake test safety feature provided by an embodiment of the invention.

FIG. 19 illustrates yet another safety feature implemented in some embodiments of the invention. Braking is a key safety feature for trucks operating either in linked mode or independently. The ability to determine brake condition while underway is of significant value, and can be accomplished by the method shown in FIG. 19. In particular, while the vehicle is moving, the driver applies the brakes at 1900. The vehicle control unit 1300 samples the input from the vehicle sensor to (1) detect deceleration, shown at 1905; (2) detect wheel slip(s), shown at 1910; and, (3) detect brake air pressure, shown at 1915. Based on the collective data, brake condition is calculated at 1920. The result of the calculation can be displayed to the driver or the fleet manager (through the long range communication link), and can provide a warning or alert if the brake condition is abnormal. Additionally, if the truck is available for linking, the result of the calculation at step 1920 can be used to choose whether to link as part of a particular pair, shown at 1925. If a link is to be made, the calculation can be used to determine which truck of the pair should lead, 1930, or to adjust the gap or algorithm, 1935.

Figure 20A:
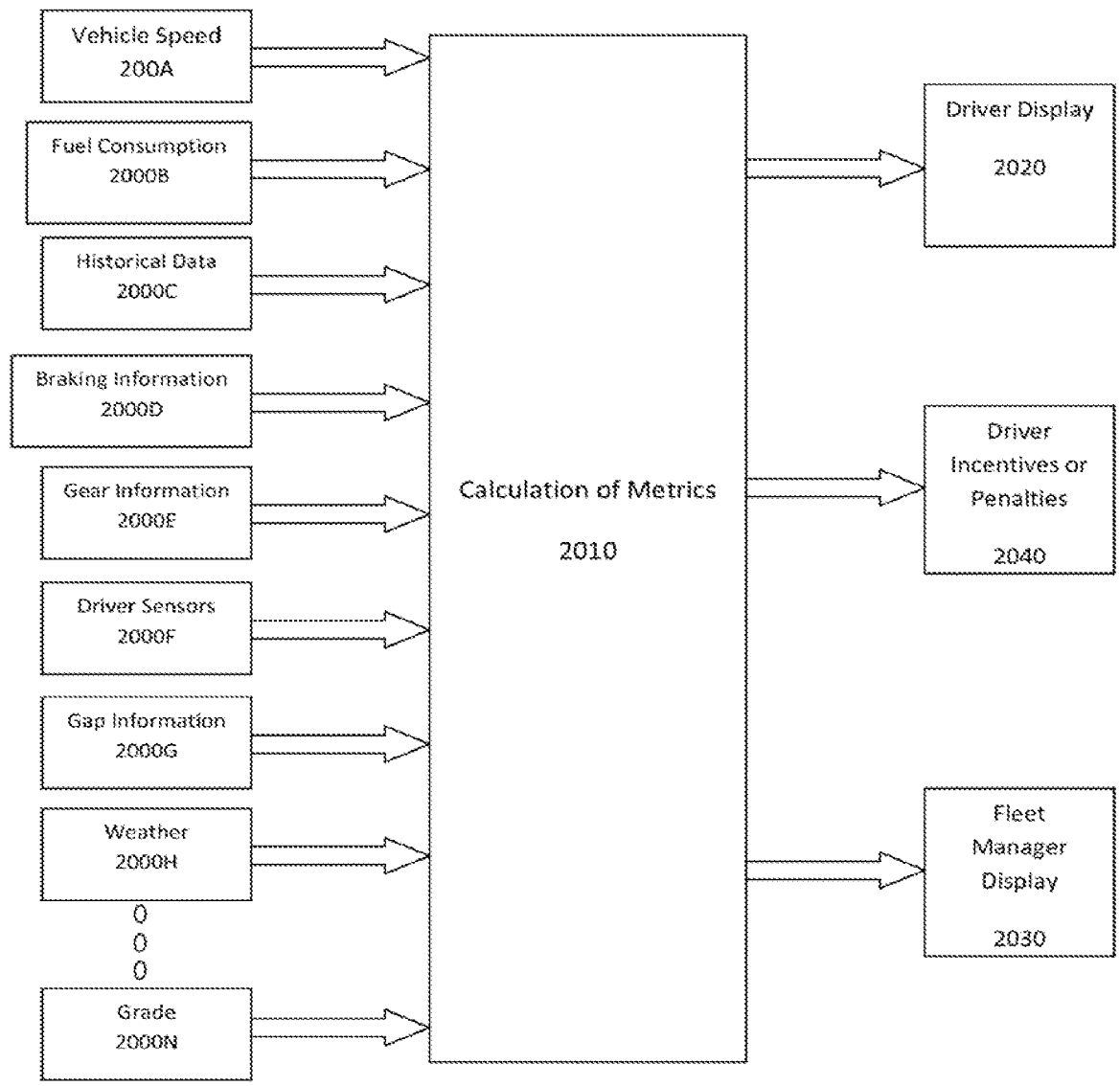
FIGS. 20A-B illustrate in block diagram form an aspect of some embodiments of the invention for providing a variety of metrics for assessing truck and driver performance, and for routing appropriate information to the driver and the fleet manager.
Figure 20B:
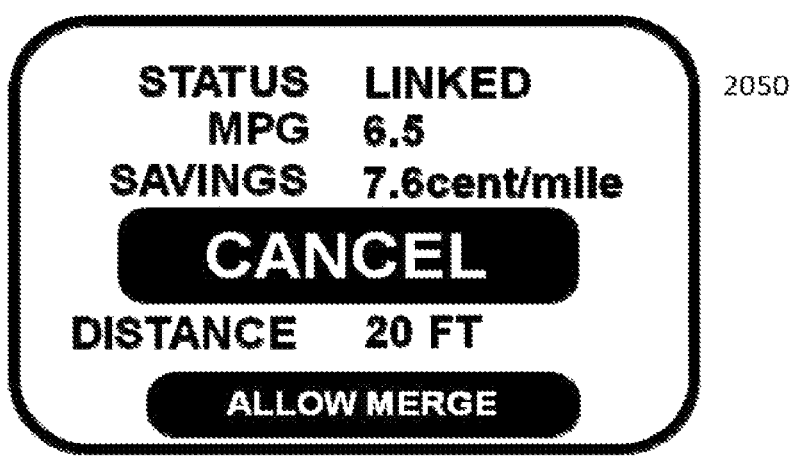

Referring next to FIGS. 20A-B, an embodiment for collecting data about the operation of a particular truck, and a fleet as a whole, can be better appreciated. A variety of measured data 2000A-n, including vehicle speed, fuel consumption, historical data, braking information, gear information, driver sensors, gap information, weather, and grade as just some examples, are provided to the central server or the on-board system 2010. The server or other processor 2010 calculates a selection of metrics including miles per gallon, driver efficiency, savings, time linked, availability of linkings, and numerous variations. From these, selected metrics can be displayed to the driver, 2020, or the fleet manager 2030, or can be used to provide driver incentives, 2040. An exemplary display 2050 for the driver is illustrated in FIG. 20B, particularly by showing the savings per mile achieved by the driver.

Data from the vehicles can provide specific information on best practices for a variety of aspects of driving. First, the data must be aggregated to form a database of best practice. This can take the form of an average (or median) of data traces, or can be calculated based on a weighted cost function. In one algorithm, higher fuel economy traces are weighted more heavily, and a weighted average is then calculated for each control input. In another, the drive is separated into segments and the single best drive for each of those segments is identified. Other considerations can also be factors, for example mechanical considerations such as engine overheating, brake condition and others.

This database of best practices may also be a function of truck and conditions. In one embodiment, there is a separate best practice for each model of truck. Once this best practices data is created, it can be applied to a wide variety of control inputs. These include gear selection, speed selection, route selection. It can include the specific means to attain each of these selections, including pedal application, transmission retarder activation, compression (jake) brake application. These optimized control inputs can then be communicated to either the driver or an automated system, or a combination thereof. If to an automated system, these can be used to adjust the target speed, or shifting selection or other parameters of the automation system.

In some embodiments, various optimal inputs can also be suggested to the driver by displaying them on the visual display or other device. In addition, current inputs can be overlayed with calculated best inputs. We can also show the potential improvement, for example showing the current miles per gallon and the anticipated miles per gallon if the suggested choices are implemented.

The collected data can also be shown after the drive itself, either to the fleet manager, the driver, or other interested parties. This can also be used to adjust various aspects of the fleet operation, such as which driver drives in which location, which truck is used for each route, or dispatch times.

In sum, the present invention provides systems and methods for a Semi-Autonomous Vehicular Convoying. The advantages of such a system include the ability to follow closely together in a safe, efficient, convenient manner.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. In a computerized vehicular convoying control system, a vehicular convoying method for controlling a first vehicle in a convoy with a second vehicle, the convoying method comprising:
    communicating data over a communication link between the first vehicle and the second vehicle;
    determining a gap to be established and maintained between the first vehicle and the second vehicle;
    determining a brake condition while underway for the first vehicle using the steps of:
    a) applying the brakes;
    b) detecting vehicle braking data using one or more sensors on the vehicle; and
    c) calculating the brake condition using the vehicle braking data;
    controlling acceleration and deceleration of the first vehicle to maintain the gap between the first vehicle and the second vehicle, wherein the amount of acceleration and deceleration of the first vehicle is based on the brake condition, wherein the brake condition is determined based in part on detected vehicle deceleration of the first vehicle; and
    transmitting the brake condition of the first vehicle to the second vehicle.

2. The method of claim 1, wherein the vehicle braking data comprises one or more of:
    1) detected wheel slip(s), and
    2) detected vehicle brake pressure.

3. The method of claim 2, wherein the vehicle brake pressure is vehicle brake air pressure.

4. The method of claim 1, additionally comprising communicating the calculated brake condition to the driver.

5. The method of claim 1, additionally comprising communicating the calculated brake condition to a fleet manager using a long range communication link.

6. The method of claim 1, additionally comprising adjusting the determination of the gap based on the calculated brake condition.

7. The method of claim 1, additionally comprising determining whether or not the vehicle should be in a convoy based on the calculated brake condition.

8. The method of claim 1, additionally comprising:
    calculating a brake condition for each of the first vehicle and the second vehicle; and,
    based on the two calculated brake conditions, determining which of the two vehicles should be the lead vehicle in a convoy.

9. The method of claim 8, wherein the first vehicle is the follower vehicle, and the second vehicle is the lead vehicle.

10. The method of claim 1, wherein the step of controlling the acceleration and deceleration comprises commanding engine torque.

11. The method of claim 10, wherein the step of controlling the acceleration and deceleration also comprises controlling braking.

12. The method of claim 1, wherein the communication link is a wireless link using at least two inter-vehicular transceivers.

13. The method of claim 1, wherein at least two inter-vehicular transceivers are further configured to transmit and receive using one or more of:
    a radio frequency, a visible spectrum, an infrared spectrum, or an ultraviolet spectrum.

14. The method of claim 13, wherein the at least two inter-vehicular transceivers are configured to use one or more radio frequencies in a Dedicated Short Range Communications (DSRC) band using the 802.11 p standard.

15. The method of claim 1, wherein the communication link is a long range communication system comprising a central server.

16. The method of claim 15, wherein the central server communicates with both the first vehicle and the second vehicle.

17. The method of claim 15, wherein the communication link provides a data link.

18. The method of claim 1, wherein the step of controlling the acceleration and deceleration comprises monitoring the gap between the first vehicle and the second vehicle.

19. The method of claim 18, wherein the step of monitoring the gap between the first vehicle and the second vehicle comprises using at least one of: a radar system or a lidar system.

20. The method of claim 1, wherein the first vehicle and the second vehicle are tractor trailer trucks.

* * * * *